United States Patent
Herrmann et al.

(10) Patent No.: US 12,384,296 B2
(45) Date of Patent: Aug. 12, 2025

(54) REARVIEW DEVICE FOR VEHICLES WITH CIRCUIT BOARD

(71) Applicant: MOTHERSON INNOVATIONS COMPANY LIMITED, London (GB)

(72) Inventors: Andreas Herrmann, Stuttgart (DE); Chang Kyun Han, Chungcheongbuk-do (KR); Cheol Ho Yim, Chungcheongbuk-do (KR); Won Sik Hong, Chungcheongbuk-do (KR)

(73) Assignee: Motherson Innovations Company Limited, London (GB)

(*) Notice: Subject to any disclaimer, the term of this patent is extended or adjusted under 35 U.S.C. 154(b) by 876 days.

(21) Appl. No.: 17/629,278

(22) PCT Filed: Jul. 23, 2020

(86) PCT No.: PCT/EP2020/070820
§ 371 (c)(1),
(2) Date: Jan. 21, 2022

(87) PCT Pub. No.: WO2021/018730
PCT Pub. Date: Feb. 4, 2021

(65) Prior Publication Data
US 2022/0242311 A1    Aug. 4, 2022

Related U.S. Application Data

(63) Continuation-in-part of application No. 16/524,953, filed on Jul. 29, 2019, now abandoned.

(30) Foreign Application Priority Data

Jul. 29, 2019   (DE) .................... 10 2019 120 396.1

(51) Int. Cl.
*B60R 1/04*    (2006.01)
*B60R 1/12*    (2006.01)

(52) U.S. Cl.
CPC ............. *B60R 1/04* (2013.01); *B60R 1/1207* (2013.01); *B60R 2001/1223* (2013.01)

(58) Field of Classification Search
None
See application file for complete search history.

(56) References Cited

U.S. PATENT DOCUMENTS

2006/0255960 A1* 11/2006 Uken .................. B60K 35/00
340/815.4
2009/0002575 A1*  1/2009 Yamada .............. B60R 1/088
349/1

(Continued)

FOREIGN PATENT DOCUMENTS

EP        3126935 B    6/2018
WO   WO 2004/060721 A1  7/2004

(Continued)

OTHER PUBLICATIONS

German Office Action dated Jan. 28, 2020 of DE 10 2019 120 396.1.

(Continued)

*Primary Examiner* — Shan Liu
(74) *Attorney, Agent, or Firm* — Jones Day

(57) ABSTRACT

The present disclosure refers to a rearview device, in particular a rearview mirror device and/or a rearview display device, mountable on a vehicle through a mounting structure, the rearview device comprising: a rearview element including at least one of a reflective element and a display element; a circuit board for providing an electrical connection to at least one of the rearview element, a light module, a heating element, sensing means and a human machine interface; and a housing coupled with the mounting structure, wherein the housing provides a mounting coupling portion to which the mounting structure is connected and an internal space in which the circuit board is arranged, wherein at least one fastening member for coupling the housing and (Continued)

the mounting structure is engaged on the mounting coupling portion, wherein the circuit board is attached to the housing adjacent to the mounting coupling portion, and wherein the circuit board is arranged in the internal space of the housing so as to not interfere with the installation of the rearview device on the vehicle when the at least one of the fastening member is engaged on the mounting coupling portion.

17 Claims, 20 Drawing Sheets

(56) References Cited

U.S. PATENT DOCUMENTS

| | | | | |
|---|---|---|---|---|
| 2010/0033857 | A1* | 2/2010 | Filipiak | B60R 1/04 |
| | | | | 359/872 |
| 2012/0236388 | A1* | 9/2012 | De Wind | G02F 1/13338 |
| | | | | 359/267 |
| 2012/0268961 | A1* | 10/2012 | Cammenga | B60R 1/12 |
| | | | | 359/884 |
| 2014/0293169 | A1* | 10/2014 | Uken | B60R 1/12 |
| | | | | 349/12 |
| 2015/0334354 | A1 | 11/2015 | Uken et al. | |
| 2016/0082889 | A1* | 3/2016 | Minikey, Jr. | G02F 1/163 |
| | | | | 359/265 |
| 2016/0264054 | A1 | 9/2016 | Uken et al. | |
| 2017/0201661 | A1 | 7/2017 | Conger | |
| 2018/0257566 | A1* | 9/2018 | Hamlin | B60R 1/12 |

FOREIGN PATENT DOCUMENTS

| | | |
|---|---|---|
| WO | WO 2004/103772 A2 | 12/2004 |
| WO | WO 2012/051294 A2 | 4/2012 |
| WO | WO 2013/071070 A1 | 5/2013 |
| WO | WO 2017/191558 A1 | 11/2017 |

OTHER PUBLICATIONS

International Search Report dated Sep. 14, 2020 of International application No. PCT/EP2020/070820.
Written Opinion dated Sep. 14, 2020 of International application No. PCT/EP2020/070820.

\* cited by examiner

1000

REARVIEW DEVICE FOR VEHICLES WITH CIRCUIT BOARD

CROSS-REFERENCE TO RELATED APPLICATIONS

This application is a is a National Stage Entry of International Patent Application No. PCT/EP2020/070820, filed on Jul. 23, 2020, which claims the benefit of priority to both German Patent Application No. DE 10 2019 120 396.1, filed on Jul. 29, 2019, and to U.S. application Ser. No. 16/524,953, filed on Jul. 29, 2019, each of which is hereby incorporated by reference in its entirety for all purposes.

BACKGROUND

1. Technical Field

The present disclosure relates generally to rearview devices for vehicles and, more particularly, to a rearview mirror device mountable on a vehicle to provide a rear view to a driver.

2. Discussion of Related Art

A rearview mirror device is a device mounted inside or outside a vehicle to provide a driver with a visual field of a region behind and/or at the sides of the vehicle.

In addition, various elements may be installed in an internal space of the rearview mirror device so that useful information and convenience functions are provided to a driver and a passenger of the vehicle.

Currently, many users prefer a rearview mirror device design that minimizes weight and volume while providing a wide sense of sight. Accordingly, bezel-less or thin-bezel type rearview mirror devices have been developed. These kinds of rearview mirror devices provide a wider field of view and decreased weight and volume due to a reduced bezel portion in the entire housing.

Therefore, in order to provide such a rearview mirror device, a design capable of efficiently utilizing a limited space in an interior of the rearview mirror device and reducing the manufacturing cost is required.

SUMMARY

The present disclosure is directed to a rearview device capable of efficiently utilizing a limited space in an interior space of the rearview device while providing a wider field of view to a driver.

In one aspect, a rearview device mountable on a vehicle through a mounting structure includes a rearview element including at least one of a reflective element and a display element, preferably provided on at least one substrate; a circuit board for providing an electrical connection to at least one of the rearview element, a light module, a heating element, sensing means and a human machine interface; and a housing coupled with the mounting structure. The housing provides a mounting coupling portion to which the mounting structure is connected and an internal space in which the circuit board is arranged. At least one fastening member for coupling the housing and the mounting structure is engaged on the mounting coupling portion. The circuit board is attached to the housing adjacent to the mounting coupling portion. The circuit board is arranged in the internal space of the housing so as to not interfere with the installation of the rearview device on the vehicle when the at least one of the fastening member is engaged on the mounting coupling portion.

The circuit board may have a bent shape. Also the circuit board may include at least a first region and a second region. The first area and the second area may have different sizes.

At least one sensor of the sensing means may be provided and may be disposed in the first region of the circuit board for detecting light received from the rearward of the vehicle. The at least a portion of the first region may be arranged adjacent to the at least one fastening member. The second region may be spaced apart from the at least one fastening member.

The housing may further include at least one first protrusion for fastening the circuit board, and the circuit board may have a hole corresponding to each of the first protrusions, in particular for a fastening member to be connected with the respective first protrusion.

The circuit board may include a first surface and a second surface, and a first distance from the first surface to a front surface of the rearview element may be less than or equal to a second distance from a top surface of the fastening element facing with the first surface to the front surface of the rearview element.

An embodiment of the rearview device is characterized by at least one conductive spring for electrically connecting the circuit board with at least one of the rearview element, the light module, the heating element, the sensing means and the human machine interface, with preferably each conductive spring being at least partly arranged on a second protrusion, in particular surrounding at least a portion thereof, passing through an opening of the circuit board, contacting a first electrode and a second electrode, and/or tapering in the direction of the mounting structure or having a reduced diameter in the region passing through the opening of the circuit board.

It is proposed that each first electrode is provided at the edge of one of the openings of the circuit board, and each second electrode is provided at the rearview element, the light module, the heating element, the sensing means or the human machine interface to be connected with the circuit board, and/or each second protrusion is provided with a reduced diameter portion surrounded by the reduced diameter portion of the respective conductive spring and a shoulder acting as a stop for the respective conductive spring.

The rearview device may further include a housing cover disposed between the rearview element and the housing to support at least the rearview element. The housing cover may include a coated region having a predetermined reflectivity at least partially. The coated region preferably provides a bezel portion.

A periphery of the housing may be formed to be larger than a periphery of the housing cover such that an edge of the housing is at least partially exposed to a driver of the vehicle.

A peripheral region of the housing cover may include a first surface which is exposed to a driver of the vehicle and a second surface which is not exposed to the driver of the vehicle and received in the housing. There may be a step between the first surface and the second surface.

At least one third protrusion may accommodate at least a part of the housing cover, and the housing cover may be provided with at least one groove or opening corresponding to each of the third protrusions.

It is also proposed that each first, second and/or third protrusion is formed in or together with the housing.

An adhesive element may be provided between the housing cover and the rearview element for attaching the rearview element to the housing cover.

At least one opening may be formed in a front portion or a front plate of the housing cover such that the electrical connection between the rearview element, the light module, the heating element, the sensing means and/or the human machine interface on the one side and the circuit board on the other side is allowed through the opening.

The adhesive element may be formed with a groove at a position corresponding to the opening such that the electrical connection provided through the at least one opening formed in the housing cover is directly transmitted to the rearview element, the light module, the heating element, the sensing means and/or the human machine interface.

At least one hole may be formed in the housing so that at least one wire for providing the electrical connection provided from the vehicle to the circuit board may pass through the hole. The circuit board may be provided with at least one connecting member for connecting the at least one wire and at least one component disposed on the circuit board. At least one wire passing through the hole may be connected to the connecting member through an empty space between the mounting coupling portion and the circuit board.

The hole may be formed adjacent to the mounting coupling portion.

The connecting member may be attached to one surface of the circuit board in a first direction or a second direction.

The rearview device can comprise the light module, the heating element, the sensing means and/or the human machine interface.

In another aspect, a rearview mirror device mountable on a vehicle includes at least a first sensor and a second sensor for detecting light received from outside of the vehicle and a rearview element including a reflective element. An operating state of the reflective element is changed based on a signal detected from at least one of the first sensor and the second sensor. The rearview mirror device further includes a circuit board providing an electrical connection to the reflective element, a housing for providing an internal space for attaching the circuit board and an additional member between the circuit board and the housing for fixing the first sensor. At least one opening for guiding the light received from a front of the vehicle into the inside of the housing is formed on a rear cover of the housing. The additional member is disposed within a predetermined distance from the housing such that the first sensor directly receives the light entering through the opening.

The present disclosure also relates to a vehicle with at least one rearview device of the disclosure.

BRIEF DESCRIPTION OF THE DRAWINGS

The above and other objects, features and advantages of the present disclosure will become more apparent to those of ordinary skill in art by describing exemplary embodiments thereof in detail with reference to accompanying drawings, in which.

DETAILED DESCRIPTION

Figure 1:
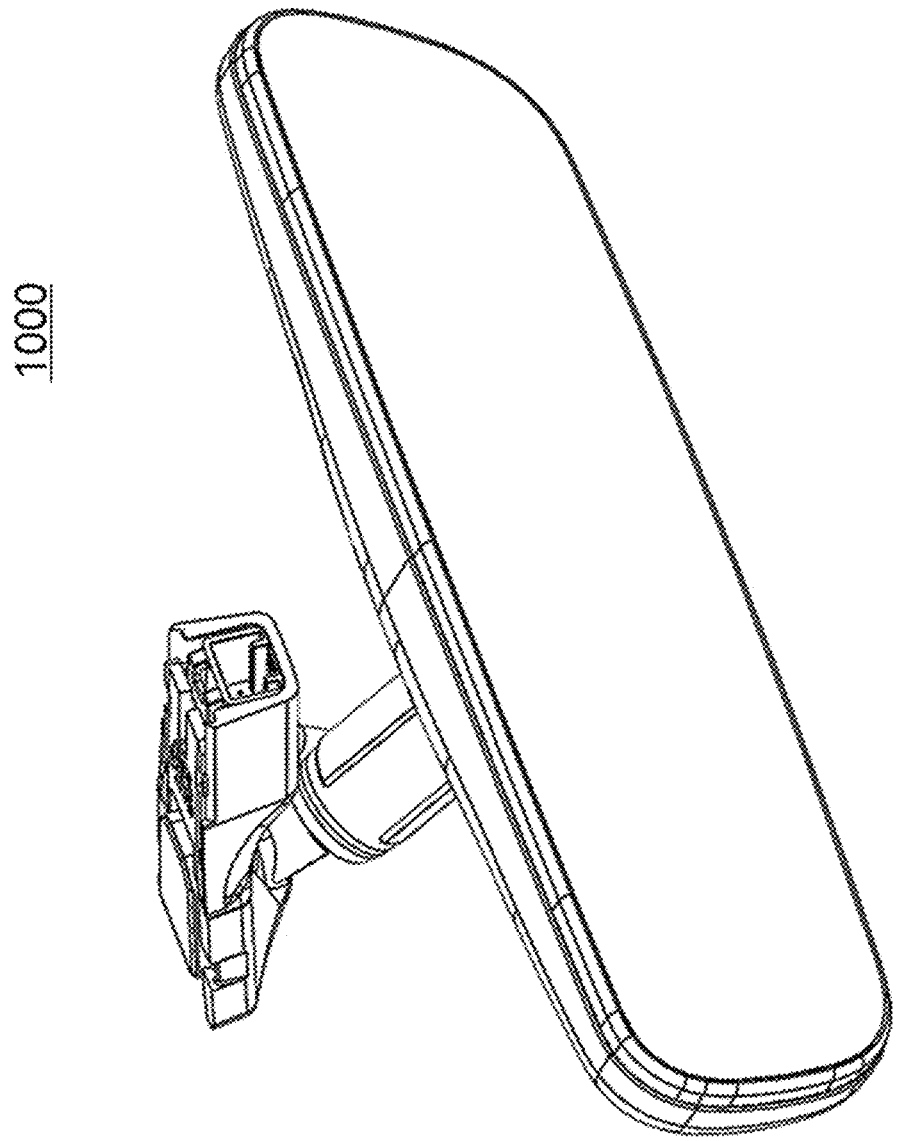
FIG. 1 is a perspective view illustrating an example of a rearview mirror device according to an embodiment of the present disclosure.

The foregoing objects, features and advantages of the present disclosure will become more apparent from the following detailed description related to accompanying drawings. However, various modifications may be applied to the present disclosure, and the present disclosure may have various embodiments. Hereinafter, specific embodiments, which are illustrated in the drawings, will be described in detail.

In the drawings, the thicknesses of layers and regions are exaggerated for clarity. When it is indicated that an element or layer is "on" or "above" another element or layer, this includes a case in which another layer or element is interposed there between as well as a case in which the element or layer is directly above the other element or layer. In principle, like reference numerals designate like elements throughout the specification. In the following description, like reference numerals are used to designate elements which have the same function within the same idea illustrated in the drawings of each embodiment.

When detailed description of known functions or configurations related to the present disclosure is deemed to unnecessarily blur the gist of the disclosure, the detailed description thereof will be omitted. Also, numerals (e.g., first, second, etc.) used in the description herein are merely identifiers for distinguishing one element from another element.

In addition, the terms "module" and "unit" used to refer to elements in the following description are given or used in combination only in consideration of ease of writing the specification, and the terms themselves do not have distinct meanings or roles.

Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art.

Hereinafter, elements of a rearview device in form of a rearview mirror device according to an embodiment of the present disclosure will be described in detail with reference to the accompanying drawings, see FIGS. 1 to 18; and further elements of a rearview device according to another embodiment of the present disclosure will be described in detail with reference to FIGS. 19 to 21*f.*

In the specification, "rearview device" is an interior mirror for vehicles that is mounted on an inner surface of a vehicle windshield to provide a field of view behind the vehicle to a driver.

Also, in the specification, the "rearview device" may further provide the driver of the vehicle with an anti-glare function related to light entering from the behind the vehicle.

Also, in the specification, the "rearview device" may further provide various additional functions, and various components for providing the additional functions may be integrated in the interior of the device.

For example, the various components may include a sensing means providing a humidity or temperature sensor configured to detect environment in an interior of the vehicle, a camera sensor or a motion sensor configured to monitor motion and/or condition of the driver of the vehicle, and/or a compass sensor, a display unit configured to provide the driver of the vehicle with various pieces of information, a human machine interface in particular with a microphone, a wireless communication unit (e.g., Wi-Fi, Bluetooth, etc.), and an antenna, a navigation system, and an input module (e.g., a button, a touch sensor, or the like), a module for payment of various fees such as a highway toll, an interface for controlled area network (CAN) communication, a light module, corresponding to each of the above-described functions.

Meanwhile, the various components for providing the additional functions may be disposed on one or more circuit boards which will be described below. Alternatively, the input module corresponding to each of the above-described functions may be provided on a housing, a housing cover, or a rearview element which will be described below.

FIG. 1 is a perspective view illustrating an example of a rearview mirror device according to an embodiment of the present disclosure. Also, FIG. 2 is an exploded perspective view for schematically illustrating each element of the rearview mirror device illustrated in FIG. 1.

Figure 2:
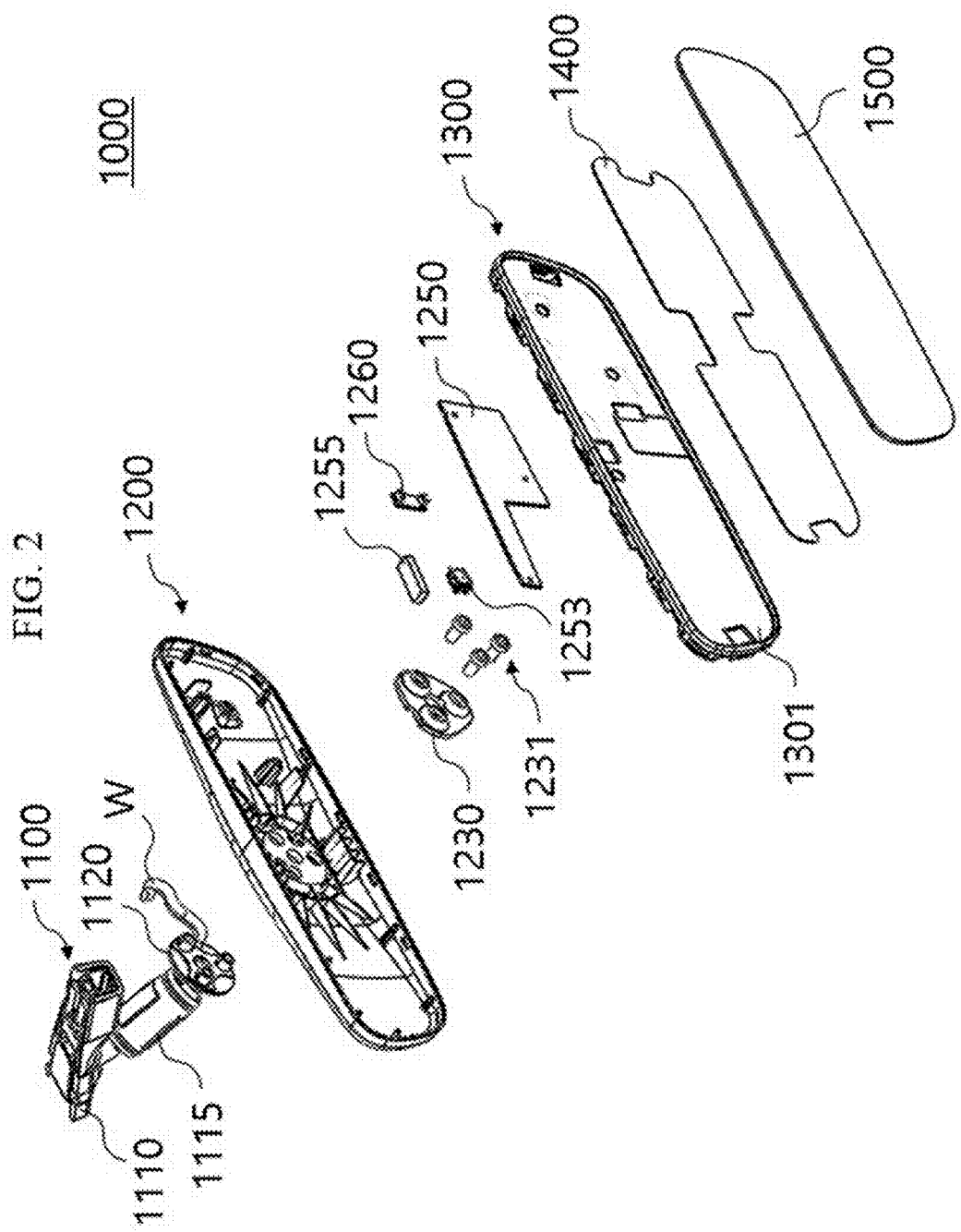
FIG. 2 is an exploded perspective view for schematically illustrating each element of the rearview mirror device shown in FIG. 1.

Referring to FIGS. 1 and 2, a rearview mirror device 1000 according to an embodiment of the present disclosure may be coupled to a mounting structure 1100 and mounted on a vehicle windshield.

Here, the mounting structure 1100 is a configuration for fixing the rearview mirror device 1000 to the windshield at a front surface of the vehicle.

For example, as illustrated in FIG. 2, the mounting structure 1100 may include a first mounting bracket 1110 coupled to the rearview mirror device 1000, a second mounting bracket 1120 coupled to the vehicle windshield, a connecting element 1115 configured to connect the first mounting bracket and the second mounting bracket, and the like.

For example, that is, the mounting structure 1100 and the rearview mirror device 1000 may be coupled to each other via at least the first mounting bracket 1110, the second mounting bracket 1120, and the connecting element 1115. Therefore, the mounting structure 1100 may serve as a support structure for safely fixing the rearview mirror device 1000 to the front surface of the vehicle.

Also, for example, the first mounting bracket 1110 and the second mounting bracket 1120 may further include a connecting structure (not illustrated) so that the rearview mirror device 1000 is rotatable vertically and/or horizontally within a preset angle range while being attached to the windshield of the vehicle.

In other words, the mounting structure 1100 may provide a rotational force so that the direction, angle, or the like of the rearview mirror device 1000 is adjustable according to a user's needs.

Therefore, the driver of the vehicle may adjust the direction, angle, or the like of the rearview mirror device 1000, which is mounted on an inner surface of the windshield, appropriately.

Hereinafter, each element of the rearview mirror device according to a first embodiment of the present disclosure will be described in detail with reference to FIGS. 2 to 17.

Referring to FIG. 2, the rearview mirror device 1000 according to a first embodiment of the present disclosure may include a housing 1200, a circuit board 1250, a housing cover 1300, an adhesive element 1400, a rearview element 1500, and the like.

The housing 1200 is a configuration for accommodating the circuit board 1250, the housing cover 1300, the adhesive element 1400, the rearview element 1500, and the like.

For example, the housing 1200 may include various coupling structures disposed inside and outside the housing 1200 so that the housing 1200 directly or indirectly accommodates the above-mentioned elements.

Also, for example, the housing 1200 may be designed to facilitate assembly of the elements while accommodating the elements in a compact manner.

The entire shape of the housing 1200 will be described below, and a coupling structure for mounting each element will be described in detail in the description of the corresponding element.

Figure 3:
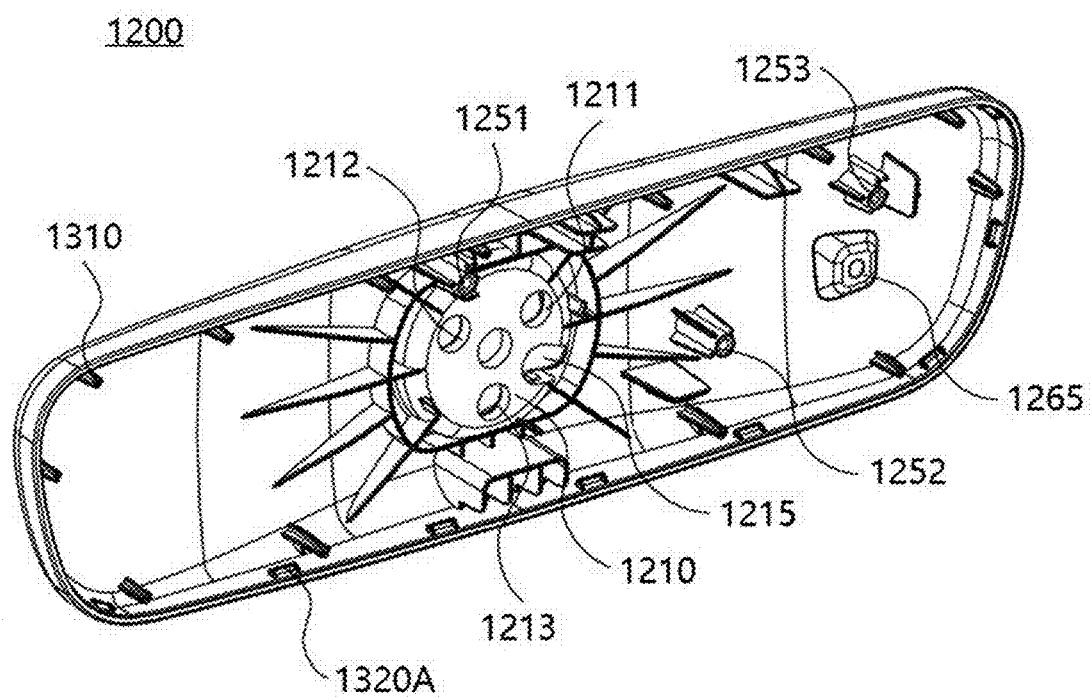
FIG. 3 is a view illustrating an example of an internal structure of a housing according to an embodiment of the present disclosure.
Figure 4:
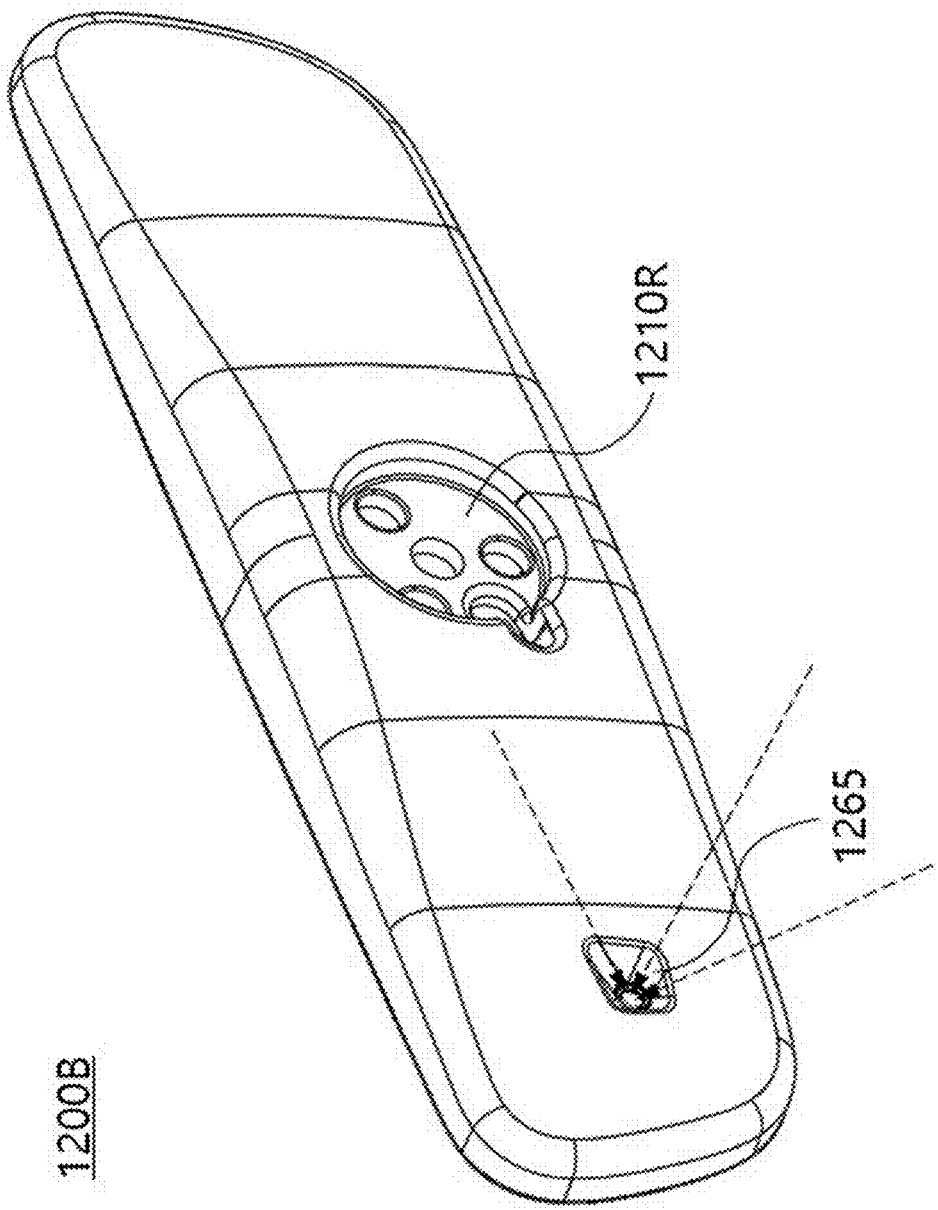
FIG. 4 is a view illustrating an example of the shape of a rear surface of the housing according to an embodiment of the present disclosure.

FIG. 3 is a view illustrating an example of an internal structure of the housing 1200 according to an embodiment of the present disclosure, and FIG. 4 is a view illustrating an example of the shape of a rear surface of the housing 1200 according to an embodiment of the present disclosure.

Referring to FIGS. 3 and 4, a mounting coupling portion 1210 for fastening the above-described mounting structure 1100 may be provided in the housing 1200.

For example, the mounting coupling portion 1210 may be formed at a central portion of the housing 1200, and the mounting structure 1100 may be coupled to the central portion of the housing 1200 via the mounting coupling portion 1210 and stably support the housing 1200.

That is, the rearview mirror device 1000 according to an embodiment of the present disclosure may be safely fixed to an upper portion of the vehicle windshield while being coupled to the above-described mounting structure 1100.

Also, for example, the mounting coupling portion 1210 may have a shape corresponding to that of the above-described first mounting bracket 1110.

For example, as described in FIG. 4, a groove 1210R to which the first mounting bracket 1110 is coupled may be provided in the rear surface of the housing 1200.

Referring to FIG. 4, the groove 1210R may be formed to be concave.

The groove 1210R which may be formed to be concave may guide an accurate attachment position of the first mounting bracket 1110 and allow the first mounting bracket 1110 to be stably coupled to the housing 1200.

On the other hand, referring to FIG. 3, a mounting coupling portion 1210F at an internal side of the housing 1200 may be formed to be convex.

In this case, the first mounting bracket 1110 may be mounted on the mounting coupling portion 1210F via additional fastening members 1230 and 1231.

For example, as illustrated in FIG. 2, a plurality of screws 1231 may be provided at the mounting coupling portion 1210, and the first mounting bracket 1110 and the housing 1200 may be firmly coupled to each other by screw coupling.

Also, as illustrated in FIG. 3, a plurality of openings 1211, 1212, and 1213 for fastening the plurality of screws 1231 may be formed on the mounting coupling portion 1210.

Also, referring to FIG. 2, an additional connecting member 1230 for coupling between the first mounting bracket 1110 and the housing 1200 may be further provided at the mounting coupling portion 1210.

For example, the connecting member 1230 may be disposed between the first mounting bracket 1110 and the housing 1200 and prevent damages to the housing 1200 when the first mounting bracket 1110 and the housing 1200 are fastened to each other by the above-described plurality of screws 1231.

Therefore, by the plurality of screws 1231 and the additional connecting member 1230, the first mounting bracket 1110 and the housing 1200 may maintain a state of being stably and firmly coupled to the upper portion of the vehicle windshield.

Also, referring to FIG. 4, at least one opening 1265 configured to guide light entering from the front of the vehicle to an inside of the housing 1200 may be formed in the rear surface of the housing 1200.

For example, the opening 1265 may have a structure recessed toward the interior of the housing 1200 in order to collect light entering from the front of the vehicle.

Also, referring to FIGS. 3 and 4, at least one hole 1215 for allowing one or more wires W, which are configured to provide electrical connection to an interior of the rearview mirror device 1000, to pass there through may be formed in the housing 1200.

For example, the rearview mirror device 1000 according to an embodiment of the present disclosure may employ an electrical connection for providing various additional functions to the driver via the rearview mirror device 1000. In this case, the electrical connection may be provided from an electronic device disposed in the interior of the vehicle.

Also, for example, the additional functions may be related to a display unit configured to provide the driver of the vehicle with various pieces of information, a communication module configured to perform communication with another electronic device disposed inside and/or outside of the vehicle, a module configured to provide a global positioning system (GPS) function, a module for payment of various transportation fees such as a highway toll, and the like.

Also, the at least one hole 1215 may be formed in an arbitrary position of the housing 1200 and may have a shape and size that allow the one or more wires to pass there through.

For example, referring to FIG. 3, the hole 1215 may be formed adjacent to the above-described mounting coupling portion 1210.

Therefore, the one or more wires W may pass through the hole 1215 along the above-described mounting structure 1100, and the one or more wires W which passed through the hole 1215 may be connected to the circuit board 1250 which will be described below.

Figure 5:
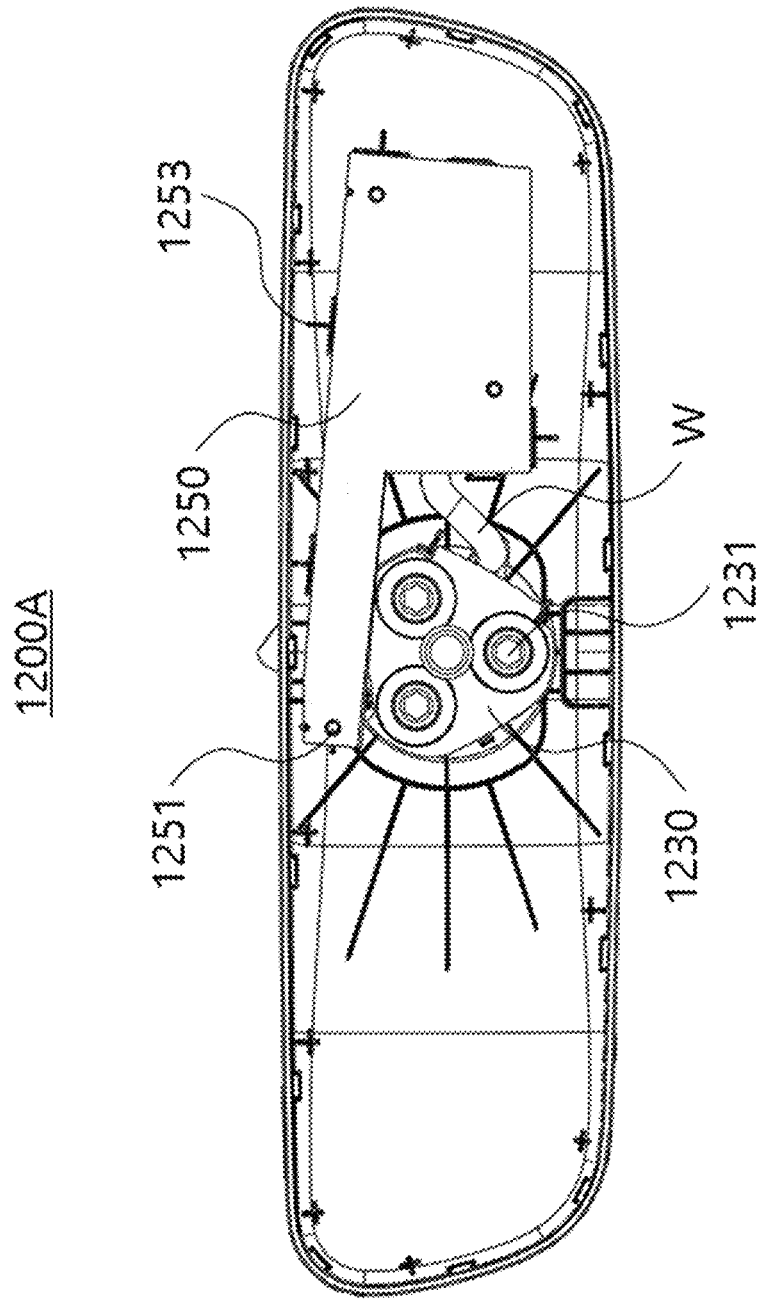
FIG. 5 is a view illustrating an example of a state in which a circuit board is attached to the housing and arranged in an internal space of the housing according to an embodiment of the present disclosure.

FIG. 5 is a view illustrating an example of an attachment position of a circuit board according to an embodiment of the present disclosure.

As illustrated in FIG. 5, one or more circuit boards may be mounted in an interior of the above-described housing 1200.

Here, the circuit board is a configuration for mounting various modules, which are configured to provide the driver with various additional functions via the rearview mirror device 1000.

For example, the one or more circuit boards 1250 may be printed circuit boards (PCBs) or flexible printed circuit boards (FPCBs) and may be one-sided or two-sided.

Also, for example, one or a plurality of circuit boards may be disposed or otherwise arranged in the internal space of the housing 1200 in order to effectively utilize the limited space in the interior of the housing 1200.

The rearview mirror device according to an embodiment of the present disclosure may include a single circuit board 1250.

That is, as illustrated in FIG. 5, the single circuit board 1250 may be arranged in the internal space of the housing 1200, and the circuit board 1250 may be a PCB.

In this case, one or more sensor modules, control modules, or the like may be disposed on the circuit board 1250.

For example, at least one or more of a first sensor module (not illustrated) and a second sensor module (not illustrated) may be disposed on the circuit board 1250.

In this case, the first sensor module and/or the second sensor module may be a sensor configured to detect light received from the rear of the vehicle.

Alternatively, the first sensor module and/or the second sensor module may be a sensor configured to detect light received from the front of the vehicle.

Also, the control module (not illustrated) may control various functions provided via the rearview mirror device 1000.

For example, the control module may adjust a reflective state of the rearview element 1500, which will be described below, on the basis of a signal received from the first sensor module and the second sensor module.

As another example, the control module may further adjust a reflective state of a rearview mirror device (not illustrated) mounted outside the vehicle on the basis of a signal received from the first sensor module and the second sensor module. The adjustment of the reflective state of the rearview element 1500 will be described in detail below in the relevant section below.

Alternatively, for example, a display unit configured to display various pieces of information may be further installed in the rearview mirror device 1000. In this case, the control module may adjust an operating state of the display unit on the basis of a signal received from the first sensor module and the second sensor module.

Hereinafter, the attachment position and shape of the above-described circuit board 1250 will be described in detail.

Additionally, FIG. 5 is a view illustrating an example of a state in which a circuit board is attached to the housing and arranged in an internal space of the housing according to an embodiment of the present disclosure.

In the rearview mirror device according to an embodiment of the present disclosure, the attachment position and shape of the circuit board may be modified in various ways in order to efficiently integrate various components in the interior of the device.

For example, the attachment position of the circuit board 1250 may be determined in consideration of ease in coupling with the above-described one or more wires W.

Alternatively, for example, the attachment position of the circuit board 1250 may be determined in consideration of the positional relationship with the components for providing various additional functions.

Alternatively, for example, the attachment position of the circuit board 1250 may be determined in consideration of attachment positions of the above-described first sensor module and second sensor module.

Referring to FIG. 5, the circuit board 1250 may be disposed adjacent to the above-described mounting coupling portion 1210.

This is to prevent the circuit board 1250 from interfering with coupling between the housing 1200 and the above-described mounting structure 1100 when at least one of the above-described fastening members 1230 and 1231 is fastened to the mounting coupling portion 1210 of the housing 1200.

In other words, the circuit board 1250 may be disposed so as to not interfere with mounting of the mounting structure 1100 and the housing 1200 on the vehicle windshield.

Also, the circuit board 1250 may be designed in various forms so that, when at least one of the above-described fastening members 1230 and 1231 is fastened to the mounting coupling portion 1210, the circuit board 1250 does not interfere with the housing 1200 being coupled to the above-described mounting structure 1100 and being mounted on the vehicle.

Alternatively, the circuit board 1250 may be designed to be mounted in a compact manner in the above-described internal space of the housing 1200, thereby minimizing the volume of the housing 1200.

Figure 6:
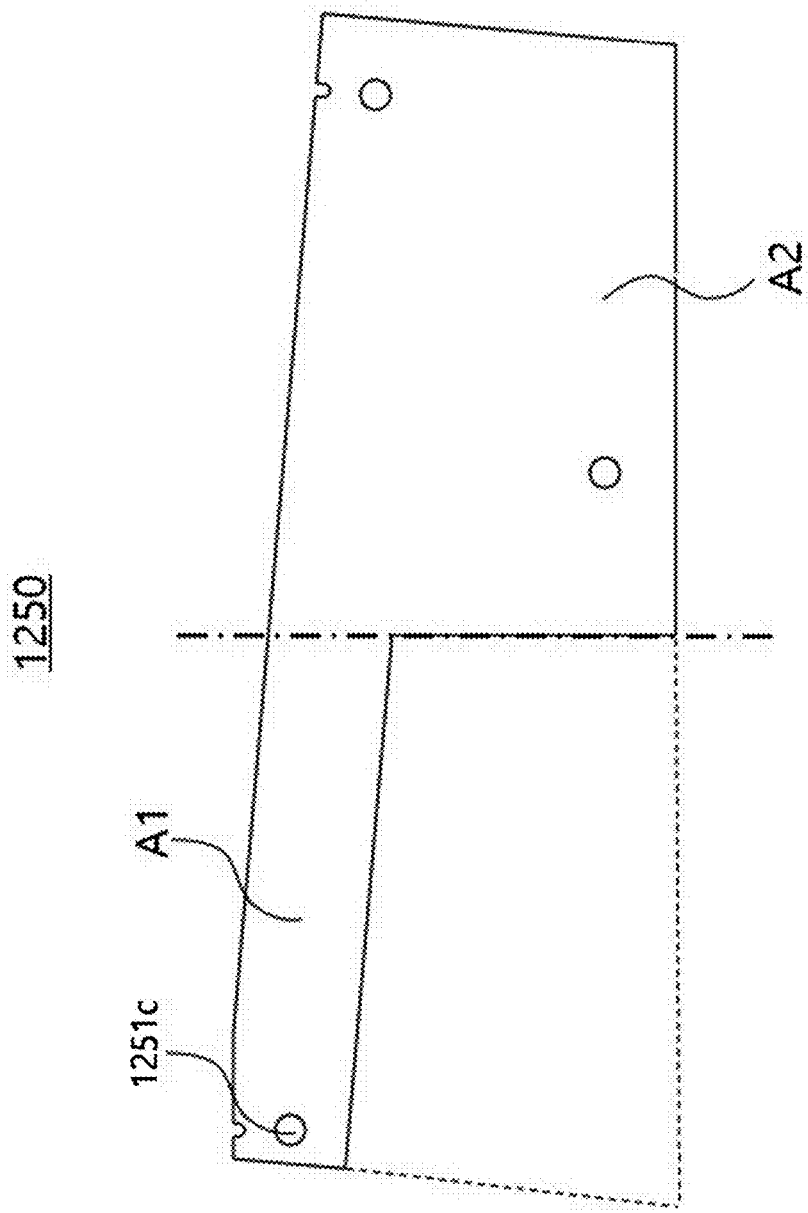
FIGS. 6 and 7 are views illustrating examples of the shape of the circuit board according to an embodiment of the present disclosure.
Figure 7:
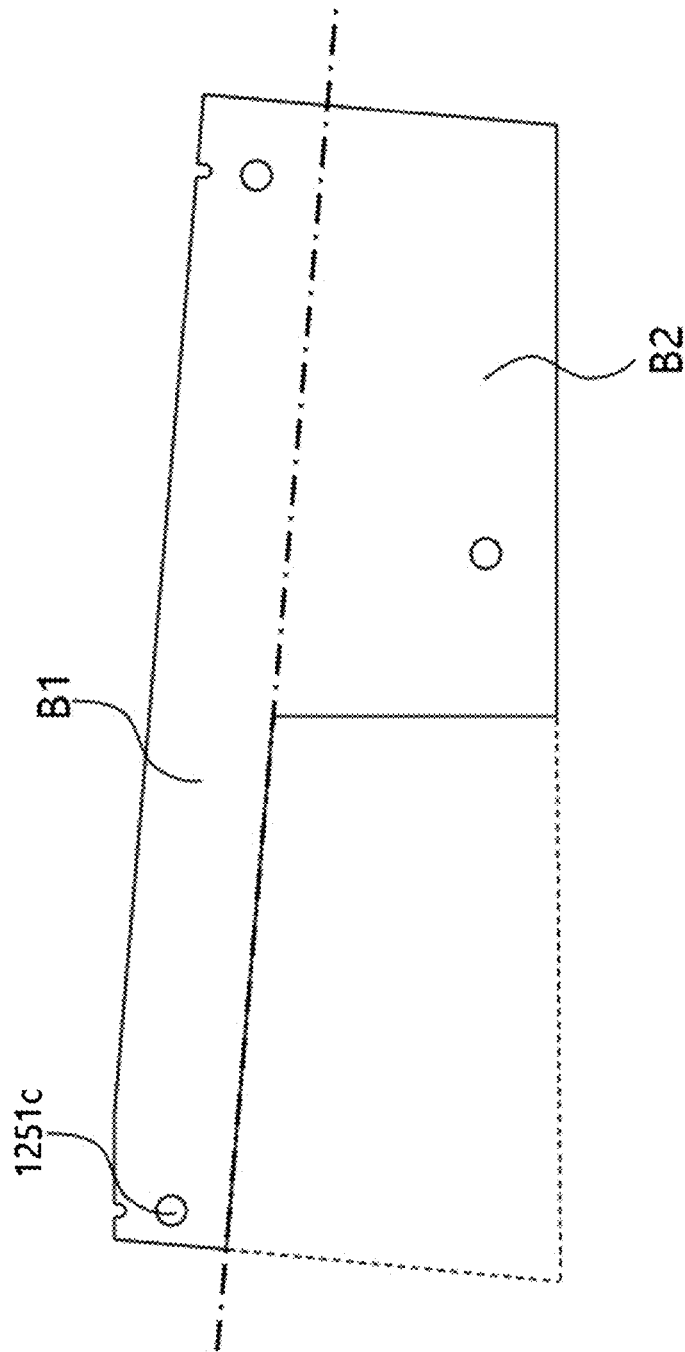

FIGS. 6 and 7 are views illustrating examples of the shape of the circuit board according to a first embodiment of the present disclosure.

For example, the circuit board according to an embodiment of the present disclosure may be formed in a bent shape in order to secure a predetermined region for coupling between the mounting coupling portion 1210 and the mounting structure 1100.

Referring to FIGS. 6 and 7, the circuit board 1250 may be divided into a first region A1 and a second region A2 or into a first region B1 and a second region B2.

For example, the first regions A1 and B1 and the second regions A2 and B2 may have different sizes.

Also, for example, as illustrated in FIG. 6, at least a portion of the first region A1 may be disposed adjacent to the mounting coupling portion 1210 disposed at the central portion of the housing 1200.

Also, for example, the first regions A1 and B1 may be a region in which the above-described at least one first sensor module is disposed.

For example, it may be desirable that the first regions A1 and B1 of the circuit board 1250 be disposed at an appropriate position for the first sensor module to detect light entering from the rear of the vehicle.

Also, for example, the first regions A1 and B1 may be disposed to be adjacent to at least one of the plurality of fastening members 1231.

That is, the first regions A1 and B1 may be disposed so as to not interfere with the at least one of the above-described fastening members 1230 and 1231 being fastened to the mounting coupling portion 1210.

Also, referring to FIG. 6, the second regions A2 and B2 may be disposed to be spaced a predetermined distance apart from the mounting coupling portion 1210.

For example, the above-described one or more wires W may enter the housing 1200 via a predetermined space provided between the second regions A2 and B2 and the mounting coupling portion 1210.

Also, for example, at least one second sensor module configured to detect light entering from the front of the vehicle may be disposed in the second regions A2 and B2.

In this case, referring to FIG. 4, the second sensor module may be mounted at a position corresponding to the opening 1265 formed in a rear cover of the above-described housing 1200. In this case, the second sensor module may directly receive light collected from the opening 1265.

Therefore, the shape and arrangement of the circuit board 1250 according to an embodiment of the present disclosure may be determined within the range in which the circuit board 1250 does not interfere with coupling between the housing 1200 and the mounting structure 1100, in consideration of appropriate positions for installing modules required for providing various functions via the rearview mirror device 1000.

However, when, as described above, the second sensor module for detecting light entering from the front of the vehicle is mounted on the circuit board 1250, it may be difficult to collect a sufficient amount of light required for the second sensor module to operate normally, according to a distance between the circuit board 1250 and the opening 1265.

Therefore, in a rearview mirror device according to another embodiment of the present disclosure, a separate member for mounting the second sensor module on a lower portion of the circuit board may be further provided so that the second sensor module is able to receive a sufficient amount of light collected via the above-described opening 1265.

In other words, by disposing a separate member for mounting the second sensor module on the lower portion of the circuit board, it is possible to adjust a distance between the second sensor module and the opening 1265.

Hereinafter, a structure for allowing the second sensor module to receive a sufficient amount of light collected via the above-described opening 1265 will be described in detail.

Figure 8:
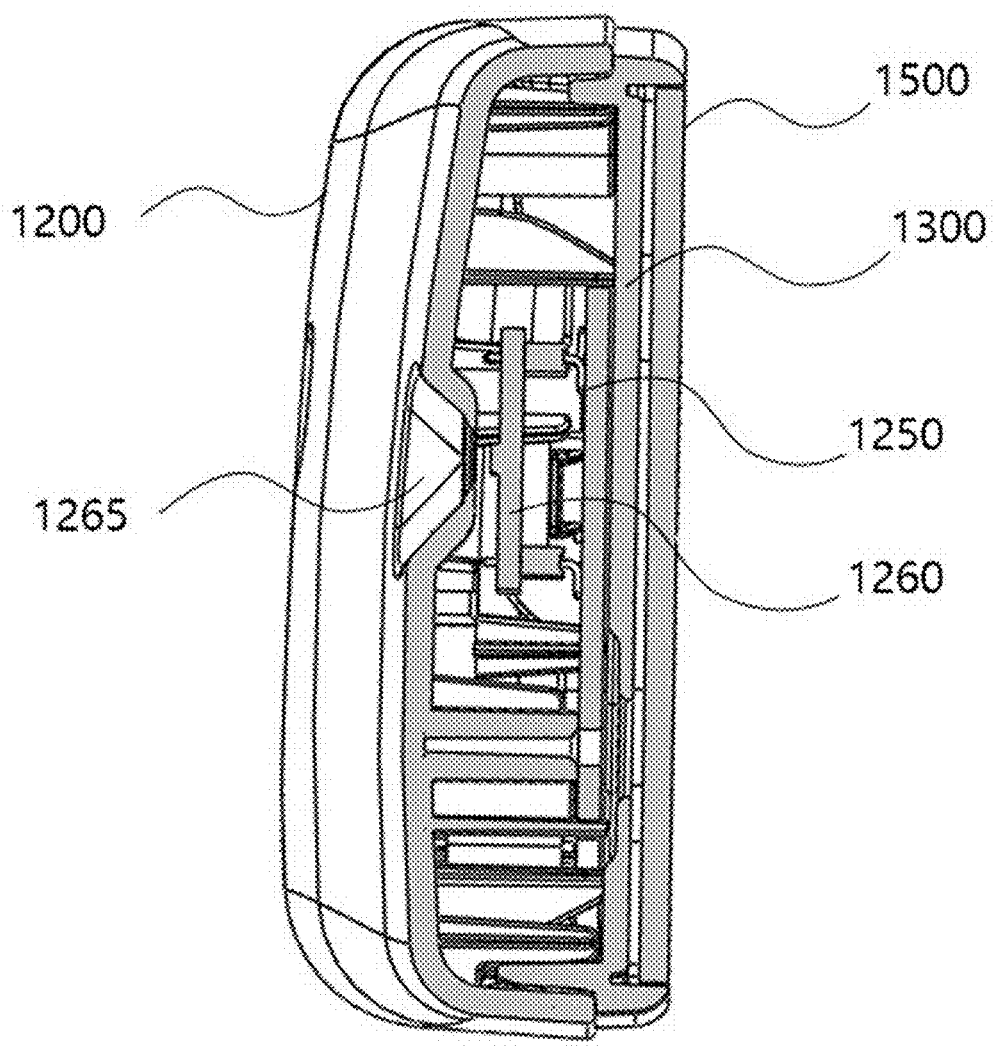
FIG. 8 is a cross-sectional view illustrating an example of the shape of an opening according to an embodiment of the present disclosure.
Figure 9:
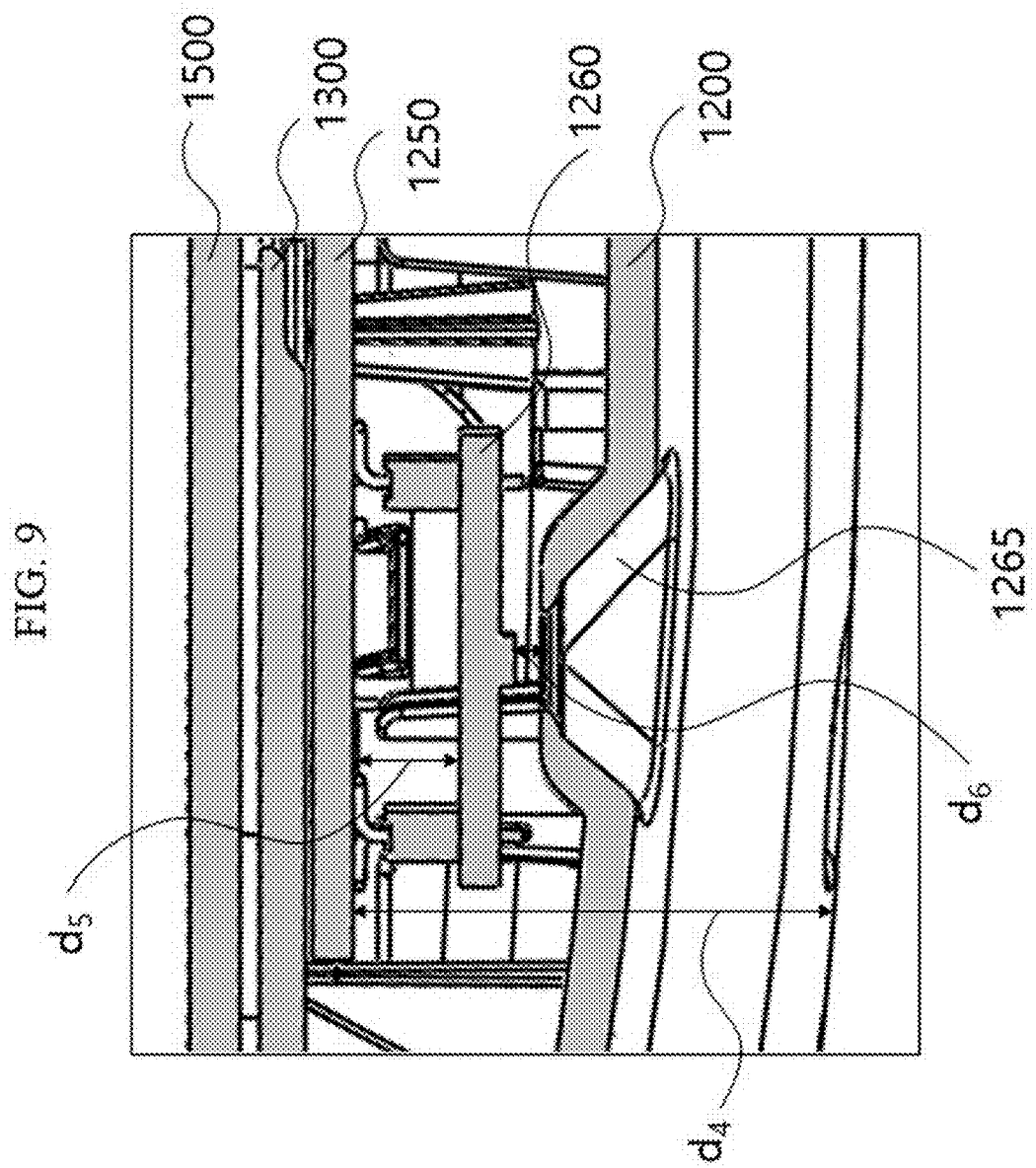
FIG. 9 is a cross-sectional view illustrating an example of a state in which a separate member is disposed according to an embodiment of the present disclosure.
Figure 10:
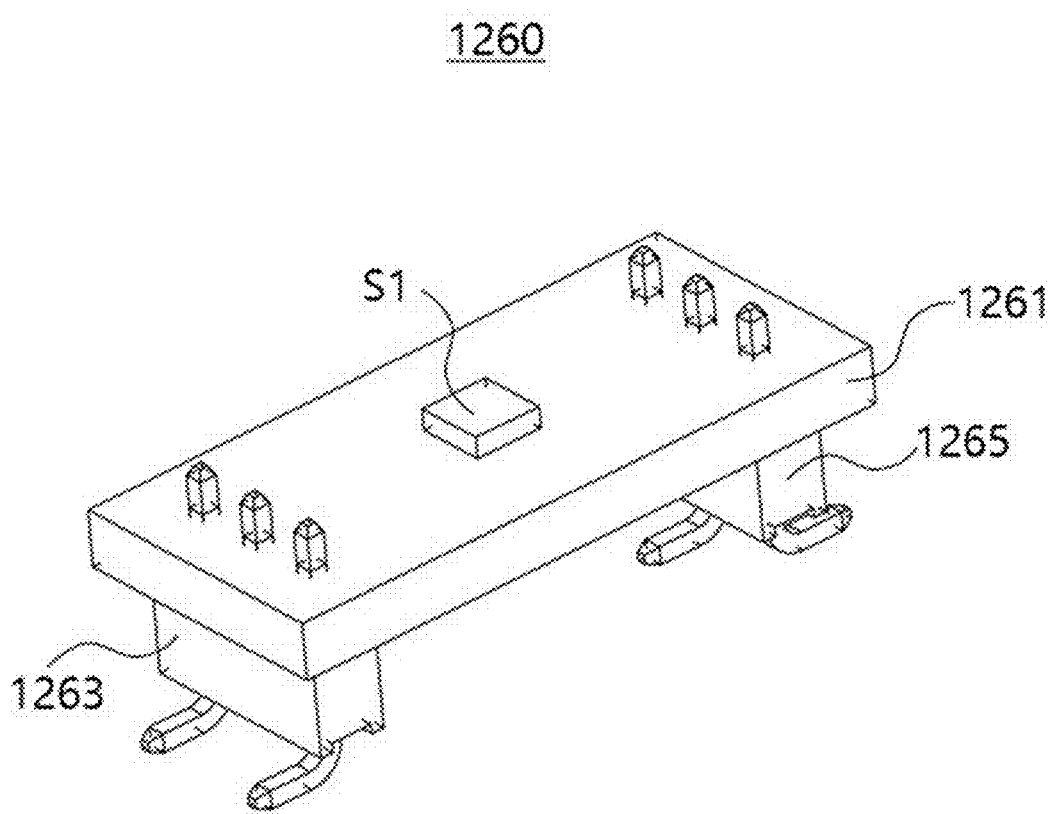
FIG. 10 is a view illustrating an example of the shape of the separate member according to an embodiment of the present disclosure.

FIG. 8 is a cross-sectional view illustrating an example of the shape of an opening according to an embodiment of the present disclosure, and FIG. 9 is a cross-sectional view illustrating an example of a state in which a separate member is disposed according to an embodiment of the present disclosure. FIG. 10 is a view illustrating an example of the shape of the separate member according to an embodiment of the present disclosure.

As described above with reference to FIG. 4, at least one opening 1265 configured to guide light entering from the front of the vehicle to the interior of the housing 1200 may be formed at the rear surface of the housing 1200.

Referring to FIG. 8, the opening 1265 may have a three-dimensional shape that is recessed toward the interior of the housing 1200 in order to collect light entering from the front of the vehicle.

For example, a cross-sectional area of the opening 1265 may gradually decrease toward the interior of the housing 1200.

Also, for example, as illustrated in FIG. 8, the shape of the opening 1265 may be asymmetrical.

That is, light entering from the front of the vehicle may be collected into the interior of the housing 1200 through the opening 1265 formed in the rear cover of the housing 1200, and the second sensor module disposed in the interior of the housing 1200 may detect the light entering from the front of the vehicle.

Therefore, the above-described control module may control various functions provided via the rearview mirror device 1000 on the basis of detected values collected from the second sensor module.

Also, as described above, in order to allow a sufficient amount of light entering through the opening 1265 to be collected into the second sensor module, there is a need to adjust a distance between the opening and the second sensor module.

For example, in order to adjust the distance between the opening 1265 and the second sensor module, a separate member 1260 on which the second sensor module is mounted may be disposed in parallel with the lower portion of the above-described circuit board 1250.

Referring to FIG. 9, the separate member 1260 may be disposed within a predetermined distance from a lower surface of the opening 1265 so that a second sensor module S1 directly receives light entering through the opening 1265.

For example, the separate member 1260 may be disposed between the housing 1200 and the circuit board 1250. That is, as illustrated in FIG. 9, the separate member 1260 may be spaced a predetermined distance d5 apart from the circuit board 1250 and disposed at the lower portion of the circuit board 1250.

Alternatively, for example, the separate member 1260 may be installed so that the second sensor module attached to an upper portion of the separate member 1260 is disposed within a predetermined distance d6 from the lower surface of the opening 1265 formed in the housing 1200.

In this case, the separate member 1260 may be fixed to the lower portion of the circuit board 1250 via at least one connecting member 1264.

For example, as illustrated in FIG. 10, the at least one connecting member 1264 may pass through the separate member 1260 and be fixed to the interior of the housing 1200.

Also, for example, the at least one connecting member may include a connecting portion 1264 configured to maintain an electrical connection with the circuit board 1250.

In this case, at least one of the first sensor module and the second sensor module may be disposed at a front surface portion of the circuit board 1250.

Therefore, the control module (not illustrated) may adjust a chromic state of the rearview element 1500, on the basis of detected values received from the first sensor module and the second sensor module attached to the upper portions of the circuit board 1250 and the separate member 1260.

Figure 11:
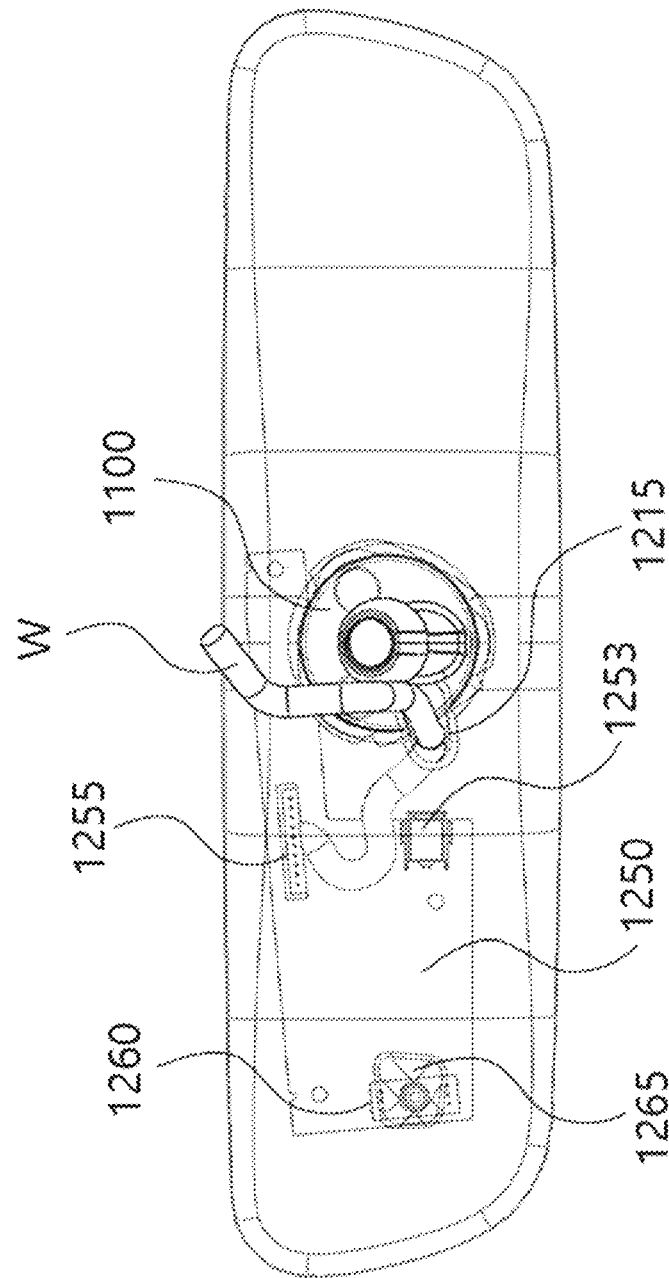
FIG. 11 is a see-through view illustrating each element mounted or coupled in the internal space of the housing according to an embodiment of the present disclosure.

FIG. 11 is a see-through view for illustrating each element mounted or coupled in the internal space of the housing according to an embodiment of the present disclosure.

Referring to FIG. 11, at least one connecting member 1255 configured to allow the one or more wires W, which passed through the above-described hole 1215, to connect the one or more components disposed on the circuit board 1250 may be further provided on the above-described circuit board 1250.

For example, the one or more wires W which passed through the hole 1215 may pass through an empty space between the above-described mounting coupling portion 1210F and the circuit board 1250 and be connected to the connecting member.

For example, the connecting member 1255 may be spaced a predetermined distance apart from the mounting coupling portion 1210F and attached to upper portions of the first regions A1 and B1 on the circuit board 1250.

As another example, the connecting member 1255 may be attached to upper portions of the second regions A2 and B2 on the circuit board 1250 adjacent to the mounting coupling portion 1210F.

As still another example, the connecting member 1255 may be attached in a first direction to one side surface of the first region.

As yet another example, the connecting member 1255 may be attached in a second direction to one side surface of the second region.

Also, for example, the above-described first sensor module may be attached to a first surface on the circuit board 1250, and the connecting member 1255 may be disposed at an arbitrary position on a second surface which is opposite the first surface.

Also, as illustrated in FIG. 11, a structure 1253 configured to support the circuit board 1250 may be further provided so that the circuit board 1250 may be fixed or otherwise attached to the housing 1200 in the internal space of the housing 1200.

Also, as described above, in order to provide a compact, lightweight rearview mirror device, there is a need for the above-described circuit board 1250 to be mounted in a compact manner in the internal space of the housing 1200.

Figure 12:
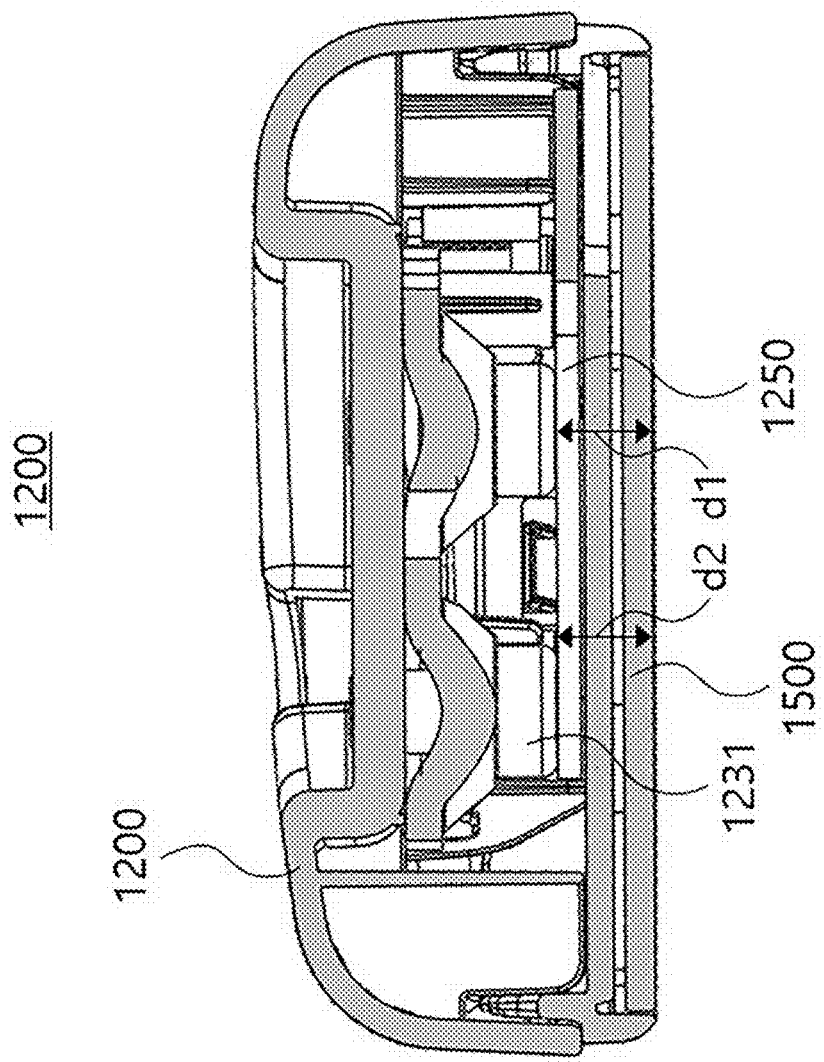
FIG. 12 is a cross-sectional view illustrating an example of a state in which the circuit board is disposed according to an embodiment of the present disclosure.

FIG. 12 is a cross-sectional view illustrating an example of a state in which the circuit board 1250 is disposed according to an embodiment of the present disclosure.

Referring to FIG. 12, the circuit board 1250 according to the first embodiment of the present disclosure may be disposed to be adjacent to at least one of the plurality of screws 1231 fastened to the mounting coupling portion 1210.

That is, the circuit board 1250 may be disposed so as to not interfere with the coupling between the mounting coupling portion 1210 and the mounting structure while being mounted in a compact manner in the internal space of the housing 1200.

For example, the circuit board 1250 may include a first surface facing a top of the screw 1231 and a second surface opposite the first surface. As illustrated in FIG. 12, a first distance d1 from the front surface portion of the rearview element 1500 to the first surface of the circuit board 1250 may be less than or equal to a second distance d2 from the front surface portion of the rearview element 1500 to an upper surface of the screw 1231.

Meanwhile, referring to FIG. 3, one or more protrusions 1251, 1252, and 1253 configured to fasten the circuit board 1250 may be formed at the housing 1200. Also, as described in FIG. 6, each hole 1251C corresponding to the protrusion 1251 is formed on the circuit board 1250.

Therefore, the circuit board 1250 may be fixed or otherwise attached to the housing 1200 through the one or more protrusions 1251, 1252, and 1253.

Figure 13:
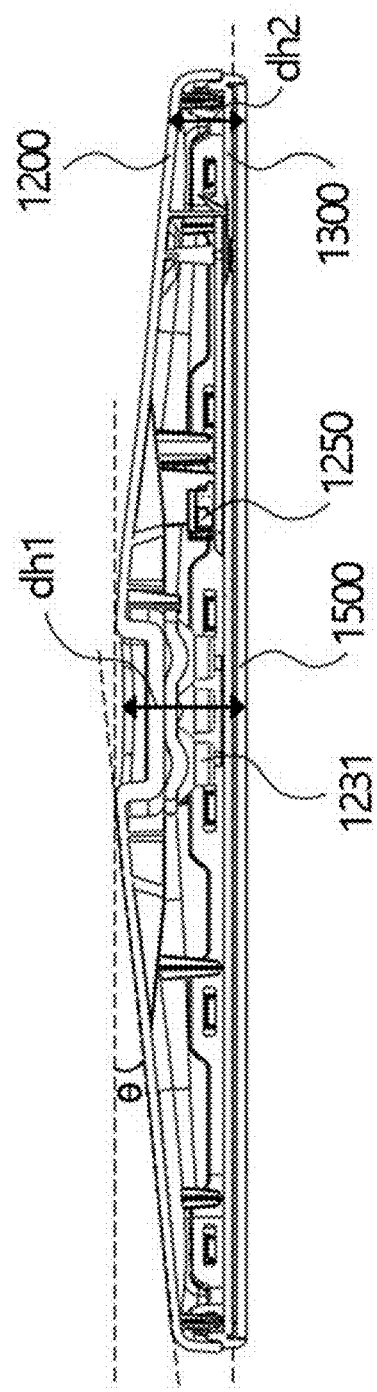
FIG. 13 is a cross-sectional view illustrating an example of the shape of the housing according to an embodiment of the present disclosure.

FIG. 13 is a cross-sectional view illustrating an example of the shape of the housing according to an embodiment of the present disclosure.

As described above, the housing 1200 according to an embodiment of the present disclosure may be designed to minimize the volume while providing an internal space for directly accommodating the mounting coupling portion and the circuit board.

For example, as illustrated in FIG. 13, the rear cover of the housing 1200 may be bent by a predetermined angle.

In this case, a vertical distance dh1 from the center of the rearview element 1500 to the rear cover of the housing 1200 may be larger than a vertical distance dh2 from both side corners of the rearview element 1500 to the rear cover of the housing 1200.

A coupling structure for coupling with other elements formed in the interior of the housing 1200 will be described in detail below along with the description of the relevant elements.

Figure 14:
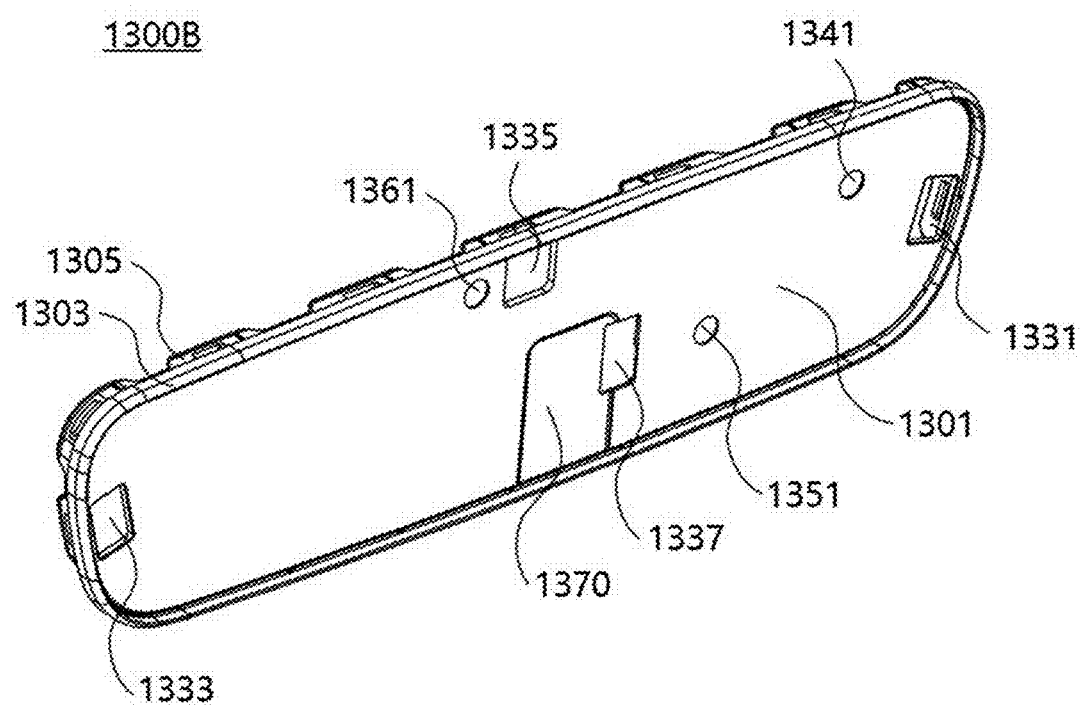
FIGS. 14 and 15 are views illustrating examples of the shape of a housing cover according to an embodiment of the present disclosure.
Figure 15:
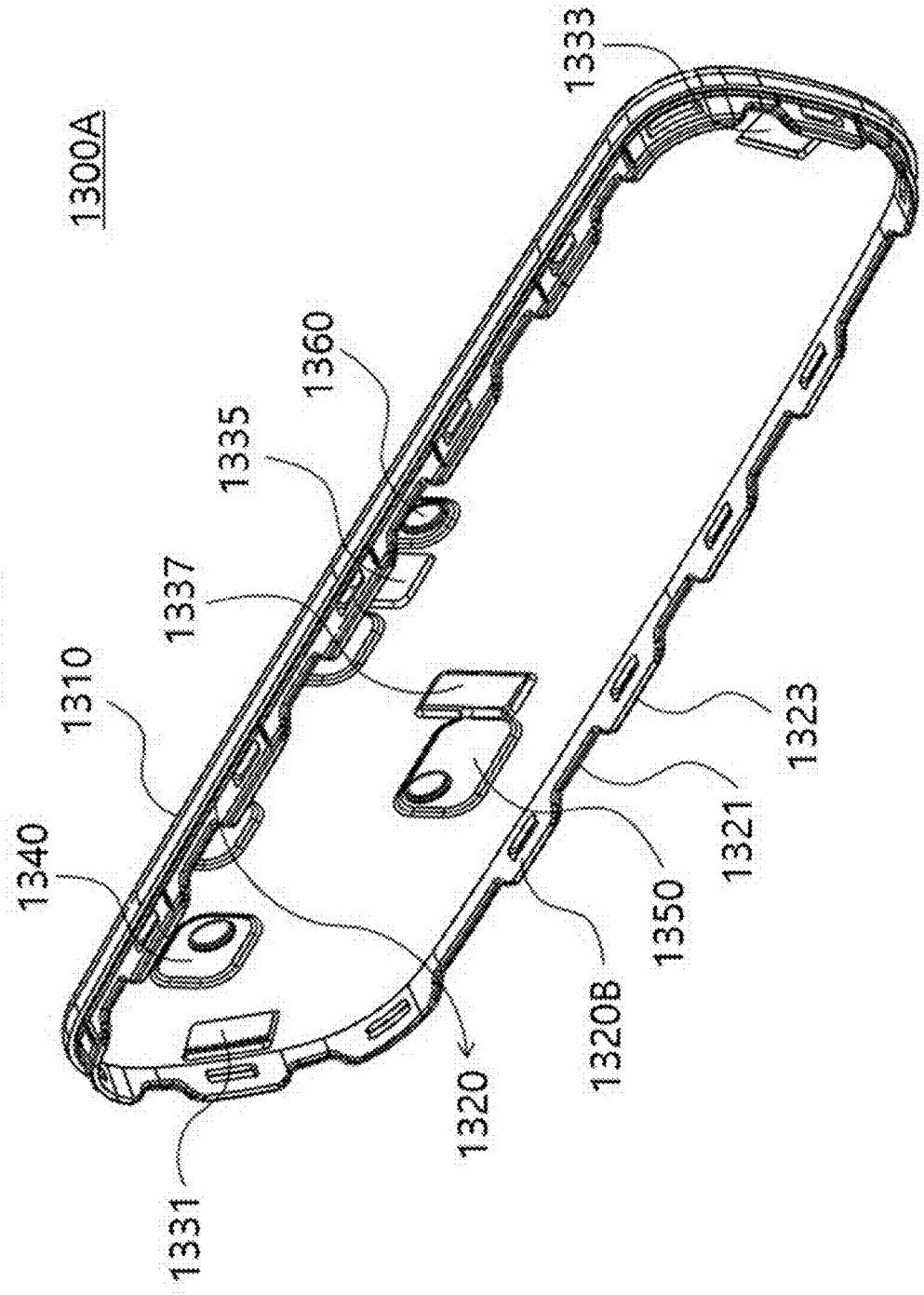

FIGS. 14 and 15 are views illustrating examples of the shape of the housing cover 1300 according to an embodiment of the present disclosure.

As described above with reference to FIG. 2, the housing cover 1300 is a configuration for supporting the rearview element 1500, which will be described below, and may be disposed between the rearview element 1500 and the housing 1200.

Referring to FIG. 14, the housing cover 1300 may include a front plate 1301, a bezel portion 1303, a housing coupling portion 1305, and the like.

For example, the rearview element 1500 may be attached to the front plate 1301, and the bezel portion 1303 may be at least partially exposed to the outside.

In this case, the bezel portion 1303 may be formed along a periphery of the front plate 1301, and the rearview element 1500 may be accommodated in a predetermined space defined by the front plate 1301 and the bezel portion 1303.

Therefore, the housing cover 1300 according to an embodiment of the present disclosure may support the rearview element 1500 and, as illustrated in FIG. 1, may have a form in which the bezel portion 1303 of the housing cover 1300 is exposed to the outside.

Also, the housing cover 1300 may be made of a plastic material and may be transparent or colored.

For example, the housing cover 1300 may be formed or molded from a polymer substrate.

For example, the bezel portion 1303 may include a transparent or at least partially coated region.

That is, the bezel portion 1303 may be formed of a transparent material or coated with a material having a predetermined reflectivity such that blocking of the driver's view due to the bezel portion 1303 is minimized.

For example, the bezel portion 1303 may be at least partially coated by decorative coating, advanced surface technology (AST) surface coating, and a spectrally controlling system.

For example, the coating material may be a chromium-based material.

The chromium-based coating may be an alloy of chromium and a dopant material, the dopant material being selected from hexagonally close-packed transition metals, the alloy having a crystal structure of a primary body-centered cubic phase in coexistence with a secondary omega hexagonally close-packed phase.

For example, the entire bezel portion 1303 of the housing cover 1300 may be coated with a material having a predetermined reflectivity.

As another example, for example, only a partial region of the bezel portion 1303 of the housing cover 1300 may be coated with a material having a predetermined reflectivity.

As still another example, a separate member (not illustrated) having a predetermined reflectivity may be coupled to a corner portion of the housing cover 1300. For example, the separate member may be coated with transparent plastic or a chromium-based material.

Also, referring to FIGS. 14 and 15, one or more openings 1331, 1333, 1335, 1337, 1341, 1351, and 1361 may be formed in the front plate 1301 of the housing cover 1300 according to an embodiment of the present disclosure.

For example, one or more openings may be provided in order to provide the rearview element 1500 with the electrical connection provided from the above-described circuit board 1250.

For example, a first opening 1331 and a second opening 1333 may be formed at both left and right sides of the front plate 1301, and an electrical connection which passes through the first opening 1331 and the second opening 1333, may be provided to the rearview element 1500.

Figure 16:
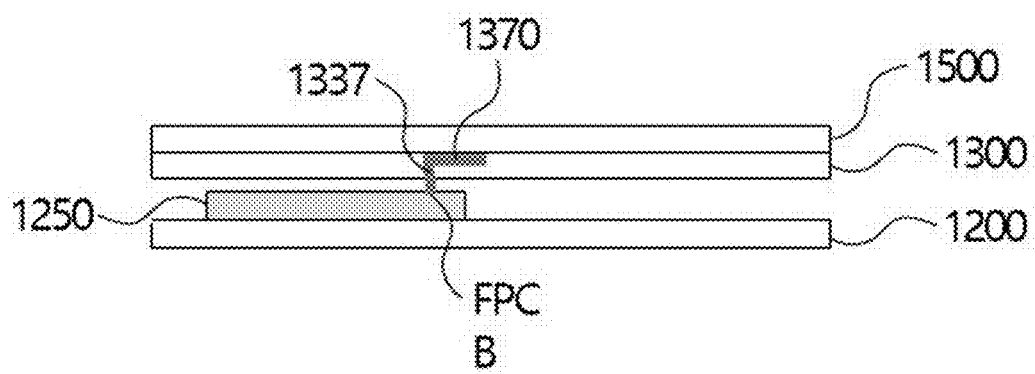
FIG. 16 is a view illustrating an example of a structure in which the housing cover and a rearview element are disposed according to an embodiment of the present disclosure.

FIG. 16 is a view illustrating an example of a structure in which the housing cover 1300 and the rearview element 1500, which will be described below, are disposed according to an embodiment of the present disclosure.

For example, referring to FIG. 16, at least one fourth opening 1337 may be formed in one side of the front plate 1301 so that an electrical connection element (FPCB), which is provided at one side of the rearview element 1500 and extends toward the circuit board 1250, may pass through the fourth opening 1337.

Also, for example, one end of the electrical connection element (FPCB) extending from the rearview element 1500 may be attached to the one side of the front plate 1301.

For example, a groove 1370 to which the one end of the electrical connection element (FPCB) is attached may be further formed at an arbitrary position on the front plate 1301. In this case, the groove 1370 may guide a position at which the one end of the electrical connection element (FPCB) is attached.

Also, for example, the fourth opening 1337 may be formed adjacent to the groove 1370.

Therefore, the one end of the electrical connection element (FPCB) extending from the rearview element 1500 may be attached to the groove 1370, and the other end of the electrical connection element (FPCB) may be connected to the above-described circuit board 1250 via the fourth opening 1337.

Also, for example, in order to allow the above-described sensor to detect light entering from the rear of the vehicle, a third opening 1335 may be further provided at a position corresponding to the position at which the sensor is attached in the front plate 1301.

Therefore, light entering from the rear of the vehicle may pass through the third opening 1335 and the sensor may receive the light.

Meanwhile, as described above, one or more protrusions 1251 configured to fasten the circuit board 1250 may be formed in the interior of the housing 1200, and one or more openings 1341, 1351, and 1361 may be formed at positions corresponding to the one or more protrusions 1251 in the housing cover 1300.

When the above-described circuit board 1250 is attached to the housing 1200 in the internal space of the housing 1200, since the circuit board 1250 is fastened by a separate fastening member, the one or more openings 1341, 1351, and 1361 are formed in order to prevent portions that protrude due to coupling of the fastening member from interfering with the housing cover 1300.

For example, referring to FIG. 14, one or more grooves may be further formed in a rear surface of the housing cover 1300.

For example, as illustrated in FIG. 14, grooves 1340, 1350, and 1360 may be respectively formed at positions corresponding to the one or more openings 1341, 1351, and 1361, and a predetermined step may be formed between the housing cover 1300 and the one or more openings 1341, 1351, and 1361.

In this case, the grooves 1340, 1350, and 1360 may have a size or area larger than that of the openings 1341, 1351, and 1361 respectively corresponding thereto.

Meanwhile, the housing 1200 and the housing cover 1300 according to an embodiment of the present disclosure may be coupled without a separate fastening member.

For example, in order to allow the housing cover 1300 to be fitted to the above-described housing 1200, a separate coupling structure may be formed in the housing 1200 and the housing cover 1300.

As described above with reference to FIG. 3, in the housing 1200, a plurality of protrusions 1320A may be formed at predetermined intervals along a periphery of the interior of the housing 1200 for fastening with the housing cover 1300.

In this case, the housing coupling portion 1305 formed along a periphery of the housing cover 1300 may be coupled by being fitted to the plurality of protrusions 1320A formed along the periphery of the interior of the housing 1200.

For example, referring to FIG. 15, a periphery of the housing coupling portion 1306 may be formed to be less than a periphery of the above-described bezel portion 1303.

Therefore, the housing coupling portion 1305 of the housing cover 1300 may be coupled to the interior of the housing, and only the bezel portion 1303 may be exposed to the outside.

Also, for example, referring to FIG. 15, the housing coupling portion 1305 may include a plurality of concave portions 1321 and convex portions 1323, and the concave portions 1321 and the convex portions 1323 may be formed at preset intervals. In this case, an opening 1320B may be formed in each convex portion 1323.

For example, the openings 1320B may be formed at position corresponding to the plurality of protrusions 1320A formed along the periphery of the interior of the housing 1200, and, by the protrusions 1320A being fitted to the openings 1320B, a coupling force between the housing 1200 and the housing coupling portion 1305 may be maintained.

As another example, in the interior of the housing 1200, protrusions 1310 may be further formed at predetermined intervals along the periphery of the interior of the housing 1200. Therefore, the protrusions 1310 may serve to support the housing cover 1300 so that coupling between the housing 1200 and the housing cover 1300 is maintained.

Figure 17:
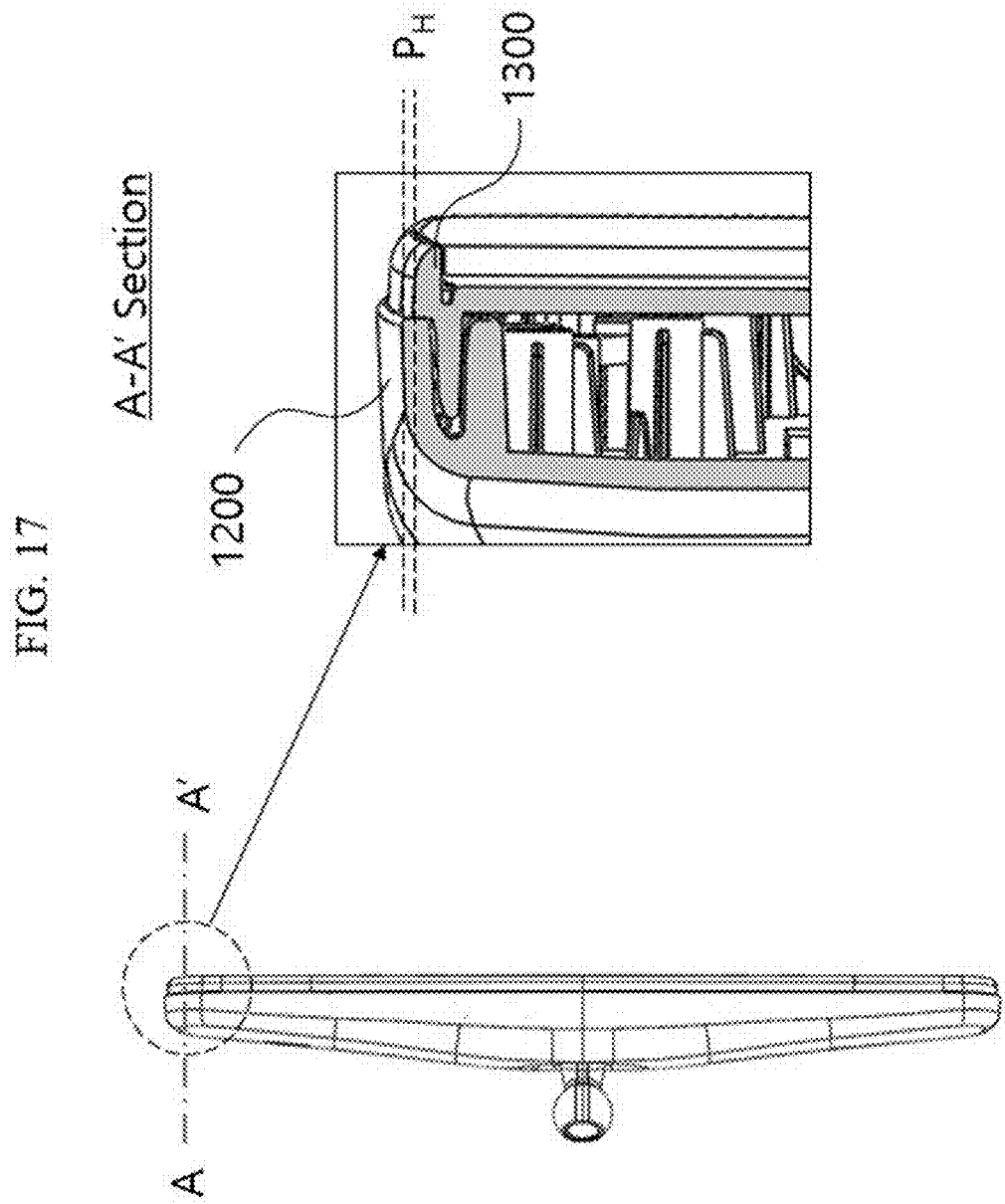
FIG. 17 is a cross-sectional view illustrating an example of a coupling state between the housing and the housing cover according to an embodiment of the present disclosure.

FIG. 17 is a cross-sectional view illustrating an example of a coupling state between the housing and the housing cover according to an embodiment of the present disclosure.

As illustrated in FIG. 17, the housing 1200 according to an embodiment of the present disclosure may be formed to be larger than the housing cover 1300 which will be described below.

For example, a peripheral length of the housing 1200 may be formed to be larger than a peripheral length of the housing cover 1300.

Alternatively, for example, as illustrated in FIG. 17, a predetermined step PH may be present between the housing 1200 and the housing cover 1300.

In this case, a peripheral surface extending from the housing 1200 toward the housing cover 1300 may form a naturally curved surface.

Therefore, at least a portion of the periphery of the housing 1200 according to an embodiment of the present disclosure may be exposed to the driver.

Figure 18:
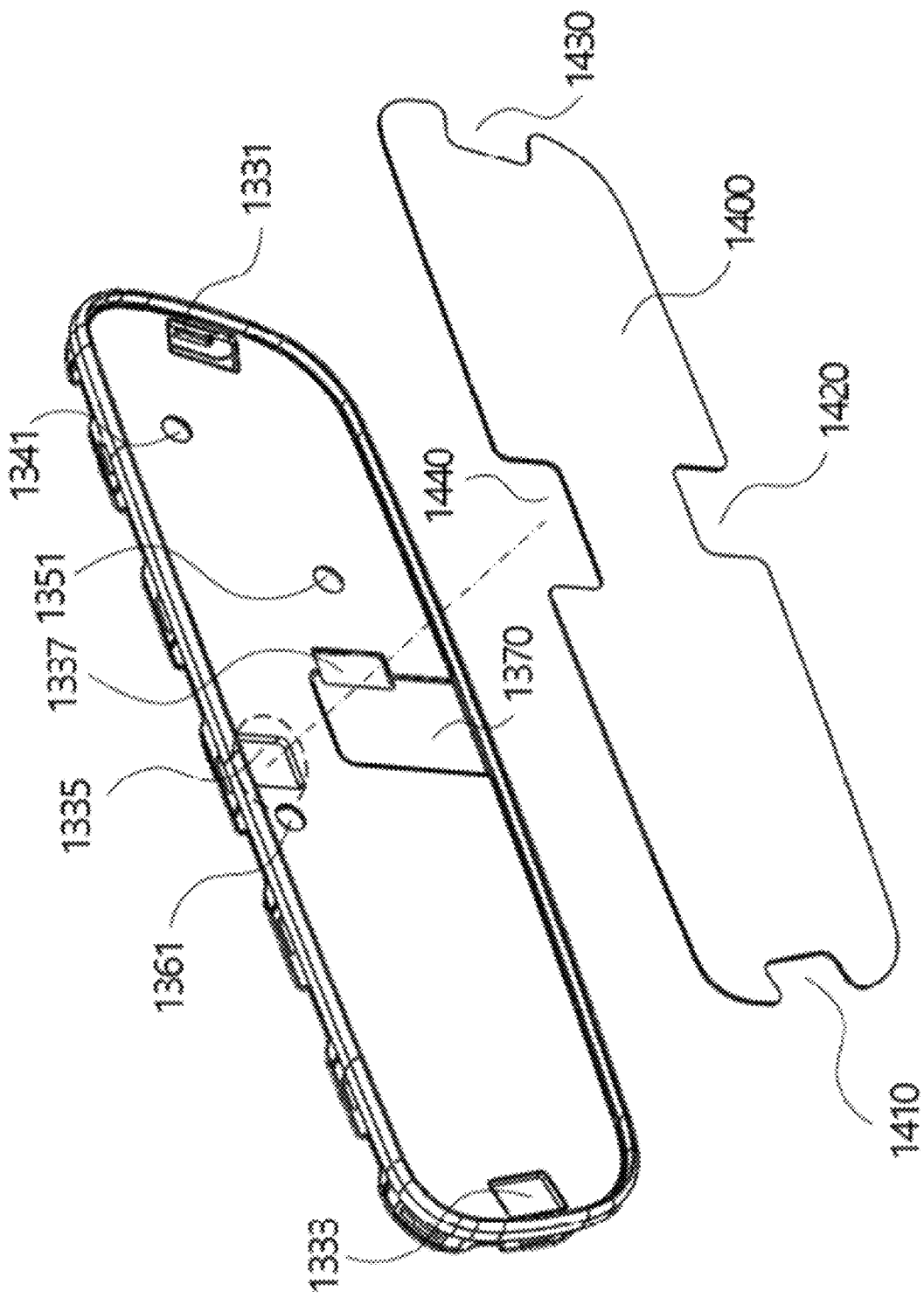
FIG. 18 is a view illustrating an example of an adhesive element according to an embodiment of the present disclosure.

FIG. 18 is a view illustrating an example of an adhesive element according to an embodiment of the present disclosure.

The adhesive element 1400 may be a configuration for attaching the rearview element 1500 to the front plate 1301 of the above-described housing cover 1300.

Also, the adhesive element 1400 is required to be formed with a material and size capable of providing a fixing force that allows the rearview element 1500 to be stably supported by the housing cover 1300.

For example, the adhesive element 1400 may be a double-sided tape.

Also, referring to FIG. 18, in the adhesive element 1400 according to an embodiment of the present disclosure, grooves 1410, 1420, 1430, and 1440 may be formed at positions corresponding to the plurality of openings 1331, 1333, 1335, and 1337 formed in the above-described housing cover 1300.

This is because there is a need to form a groove having an appropriate size at the corresponding position even in the adhesive element 1400 in order to transmit the electrical connection provided from the circuit board 1250 to the rearview element 1500 as described above with reference to FIG. 14.

In the following elements of an alternative rearview device 2000 of the present disclosure will be described in detail with reference to FIGS. 19 to 21*f*.

Figure 19:
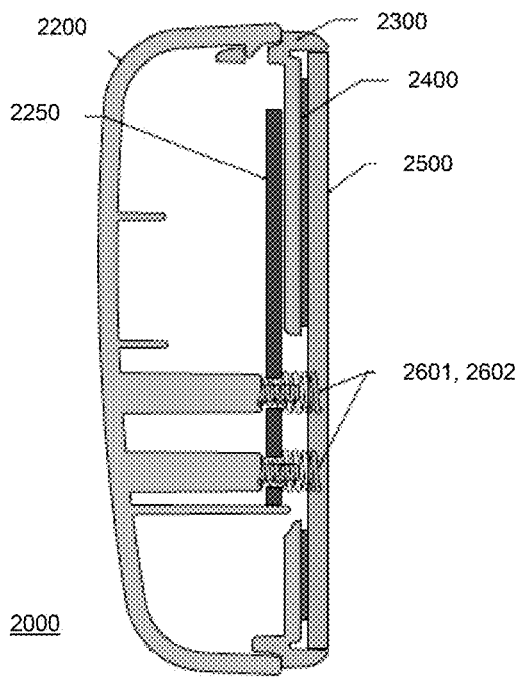
FIG. 19 is a cross-sectional view illustrating an alternative rearview device according to the present disclosure.

Referring to FIG. 19, the rearview device 2000 comprises a housing 2200 carrying a housing cover 2300, which in turn carries a rearview element 2500, which can comprise a reflective element and a display element (not shown). The rearview element 2500 is attached to the housing cover 2300 via an adhesive element 2400, preferably in form of a double sited tape.

A driver looking at the rearview element 2500 will not only see the periphery of the housing cover 2300, providing a bezel, but also an edge region of the housing 2200.

Between the housing 2200 and the housing cover 2300 a circuit board 2250 is arranged. Two conductive springs 2601, 2602 connect the printed circuit board 2250 with the display element of the rearview element 2500, as further illustrated in FIG. 20*a*. According to FIG. 20*a* the printed circuit board 2250 is provided with two openings 2252, 2253 for the two conductive springs 2601, 2602 for passing through. Each conductive spring 2601, 2602 is carried on a protrusion 2611, 2612 formed together with the housing 2200.

Figure 20A:
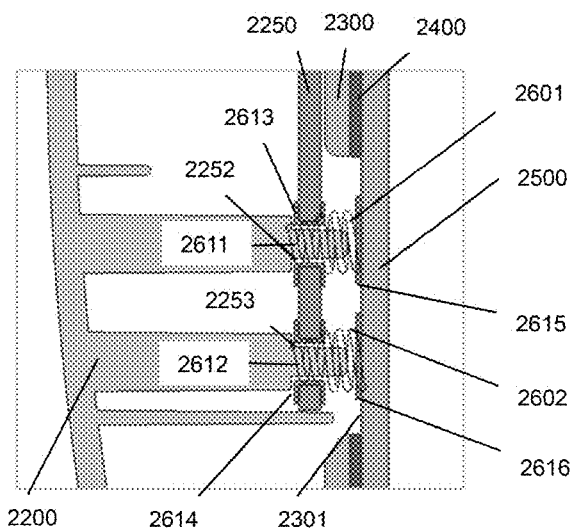
FIG. 20a is an enlarged view of a part of the cross-section of FIG. 19.
Figure 20B:
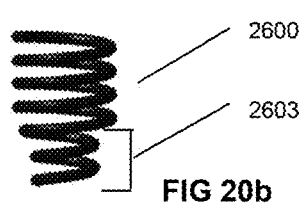
FIG. 20b is a side view of a conductive spring to be used with the rearview device of FIG. 19.
Figure 20C:
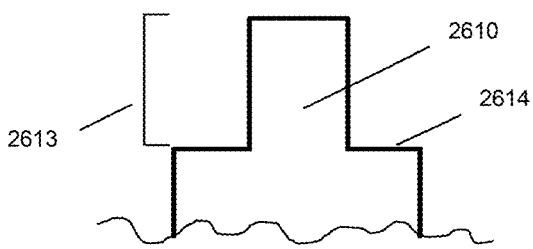
FIG. 20c is a cross-sectional view of one end of a protrusion formed with the housing of the rearview device of FIG. 19.

Further details of the geometry of the conductive springs 2601, 2602 as well as the protrusions 2611, 2612 are illustrated in FIGS. 20b and 20c. Accordingly, each conductive spring 2600 can be provided with a reduced diameter portion 2603 to pass through the respective opening 2252, 2253 of the circuit board 2250, whereas each protrusion 2610 may be formed with a reduced diameter portion 2613 in order to provide a shoulder 2614 acting as a stop for the conductive spring 2600 carried thereon.

Returning to FIG. 19, the electric contact between the printed circuit board 2250 on the one side and the display element of the rearview element 2500 on the other side is archived via electrodes 2613 to 2616. First electrodes 2613, 2614 are provided at the edges of the openings 2252, 2253 of the printed circuit board 2250, whereas second electrodes 2615, 2616 are provided on the rearview element 2500 at its side facing the housing cover 2300, such that an electric connection is automatically provided as soon as the conductive springs 2601, 2602 are arranged as shown in FIG. 20a, with the benefit of avoiding any wires between the printed circuit board 2250 and the rearview element 2500.

Existing wire connection methods for power connection between a printed circuit board and a rearview element as well as a light module, a heating element, sensing means and/or a human machine, if existing, have the following difficulties.

Difficulty in assembling due to wire length,
poor operation due to wire damage due to interference or wire pressure between wire and structure during assembly, and
noise due to wire wobble when vibration occurs in the vehicle.

In order to solve these problems, a spring connector in form of the conductive springs 2600, 2601, 2602 is installed. Through this, it is possible to solve the convenience of assembly, poor operation due to wire pressing, and noise.

Figure 21A:
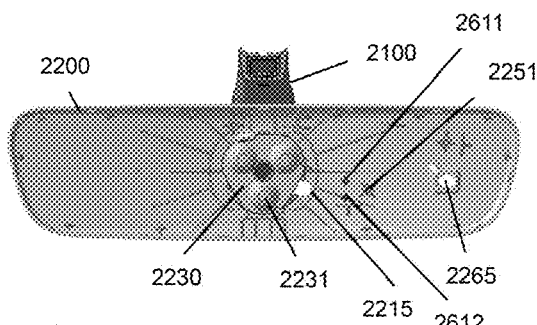
FIG. 21a-f illustrate the mounting of the printed circuit board to the housing of the rearview device of FIG. 19.
Figure 21B:
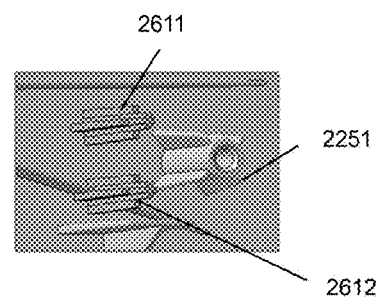

Further, the usage of the conductive springs 2600, 2601, 2602 reduces costs due to increased production efficiency with convenience of assembly and packaging. In the following, the installation of the printed circuit board 2250 as well as the conductive springs 2601, 2602 within the housing 2200 is described with reference to FIG. 21a to FIG. 21f:

FIG. 21a provides a front view of the housing 2200 to which the mounting structure 2100 is attached via fastening members 2230, 2231. The housing 2200 is provided with a hole 2215 for a wire (not shown) as described with respect to the rearview device 1000 above. Still further, the housing 2200, as better seen in FIG. 21b, is formed with a protrusion 2251 for carrying the printed circuit board 2250, and two protrusions 2611, 2612 for extending through the printed circuit board 2500.

Figure 21C:
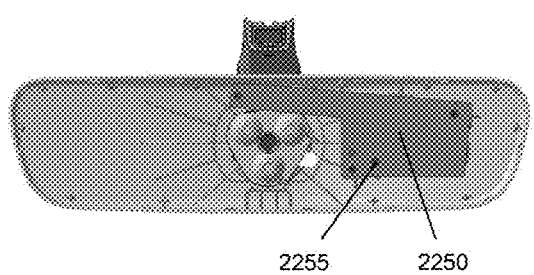
Figure 21D:
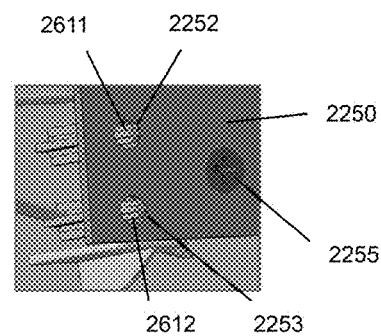

FIG. 21c shows the housing 2200 with the circuit board 2250 attached hereto, with further details being shown in FIG. 21d. Accordingly, a fastening member 2255 passes through an opening of the printed circuit board 2250 into the protrusion 2251 for attachment, whereas the protrusions 2611 and 2612 extend through the openings 2252 and 2253 of the printed circuit board 2250.

Figure 21E:
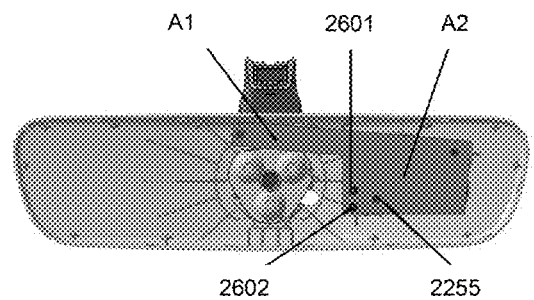
Figure 21F:
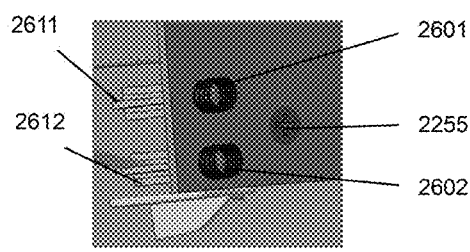

The conductive springs 2601, 2602 are mounted such that their respective reduced diameter portion passes through the respective opening 2252, 2253 and can be inserted until abutting against the shoulder of the respective protrusion 2611, 2612 while surrounding the reduced diameter portions thereof, resulting in the structure shown in FIG. 21e, with further details shown in FIG. 21f.

In a next step the housing cover 2300 carrying the rearview element 2500 can be attached to the housing 2200 to complete the assembly and reach the structure shown in FIG. 19, without any complicated measures for answering electric power transfer.

It is to be understood that the conductive spring can take various shapes and can be installed on the printed circuit board in different manners, not restricted to the hole type structure as describes above, but also in all kind of different attachment methods known to the person skilled in the art, for example via a surface mounting device.

The number of electrodes is basically implemented as two poles, but it is also possible to add or reduce electrodes.

The distance between each conductive spring acting as a spring-type connector and the respective electrode can be flexibly adapted to the geometry of the remaining parts of the rearview device.

The mechanical fastening described above can be implemented with different structures such as hooks, bolting and bonding.

The rearview device of the present disclosure is not restricted to the usage of a bezel portion but can also be of the frameless type structure.

According to the embodiments herein, a compact rearview device capable of efficiently utilizing an internal space of the device can be provided.

Also, according to some embodiments, by facilitating assembly of the rearview device, the manufacturing cost thereof can be reduced.

Although embodiments of the present disclosure have been described above using limited embodiments and drawings, one of ordinary skill in art should be capable of modifying and changing the above-described embodiments in various ways. For example, the above-described techniques may be performed in a different order from the above-described method, and/or above-described elements such as a system, a structure, a device, and a circuit may be coupled or combined in a different form from above-described method, or suitable results may be achieved even when the elements are replaced or substituted with other elements or their equivalents.

Therefore, other implementations, embodiments, and equivalents of the appended claims also belong to the scope of the claims below.

REFERENCE SIGN LIST 1000 mirror device
1100 mounting structure
1110 first mounting bracket
1115 connecting element
1120 second mounting bracket
1200 housing
1210 coupling portion
1210F mounting coupling portion
1210R groove
1211, 1212, 1213 plurality of openings
1215, 1251C hole
1230 fastening member
1231 fastening member
1250 circuit board
1251, 1252, 1253 protrusion
1251C hole
1310 protrusion 1320A protrusion
1320B hole
1253 structure
1255 connecting member
1260 separate member
1264 connecting member
1265 opening
1300 housing cover
1301 front plate
1303 bezel portion
1305, 1306 coupling portion
1321 concave portions
1323 convex portions
1320A, 1320B, openings
1331, 1333, 1335, 1337 openings
1340, 1350, 1360, 1370 groove 1341, 1351, 1361 openings
1410, 1420, 1430, 1440 groove
1400 adhesive element
1500 rearview element
1520 electrochromic device
2000 rearview device
2100 mounting structure
2200 housing
2215 hole
2230, 2231 fastening member
2250 circuit board
2251 protrusion
2252 opening
2253 opening
2255 fastening member
2265 opening
2300 housing cover
2301 opening
2400 adhesive element
2500 rearview element
2600, 2601, 2602 conductive spring
2603 reduced diameter portion
2610 protrusion
2611, 2612 protrusion
2613 reduced diameter portion
2614 shoulder
2613, 2614 electrode
2615, 2616 electrode
A1, B1 first region
A2, B2 second region
d1 first distance
d2 second distance
dh2 vertical distance
EC electrochromic
FPCB electrical connection element
IGN ignition
W wires

The invention claimed is:

1. A rearview device mountable on a vehicle through a mounting structure, the rearview device comprising:
a rearview element including at least one of a reflective element and a display element;
a circuit board for providing an electrical connection to at least one of the rearview element, a light module, a heating element, sensing means and a human machine interface;
a housing coupled with the mounting structure; and
at least one conductive spring for electrically connecting the circuit board with at least one of the rearview element, the light module, the heating element, the sensing means and the human machine interface,
wherein the housing provides a mounting coupling portion to which the mounting structure is connected and an internal space in which the circuit board is arranged,
wherein at least one fastening member for coupling the housing and the mounting structure is engaged on the mounting coupling portion,
wherein the circuit board is attached to the housing adjacent to the mounting coupling portion,
wherein the circuit board is arranged in the internal space of the housing so as to not interfere with the installation of the rearview device on the vehicle when the at least one of the fastening member is engaged on the mounting coupling portion,
wherein each conductive spring is at least partly arranged on a second protrusion surrounding at least a portion thereof,
wherein each conductive spring passes through an opening of the circuit board,
wherein each conductive spring contacts a first electrode and a second electrode, and
wherein each conductive spring is tapering in the direction of the mounting structure or having a reduced diameter in the region passing through the opening of the circuit board.

2. The rearview device of claim 1, wherein
the circuit board has a bent shape, and the circuit board includes at least a first region and a second region, with the first region and the second region having different sizes.

3. The rearview device of claim 2, further comprising:
at least one sensor of the sensing means, which is disposed in the first region of the circuit board, for detecting light received from the rearward of the vehicle.

4. The rearview device of claim 2, wherein
at least a portion of the first region is arranged adjacent to the at least one fastening member, and
the second region is spaced apart from the at least one fastening member.

5. The rearview device of claim 1, wherein
the housing further includes at least one first protrusion for fastening the circuit board, and
the circuit board has a hole corresponding to each of the first protrusions for a fasting member to be connected with the respective first protrusions.

6. The rearview device of claim 1, wherein
the circuit board includes a first surface and a second surface, with a first distance from the first surface to a front surface of the rearview element being less than or equal to a second distance from a top surface of the fastening member facing with the first surface to the front surface of the rearview element.

7. The rearview device of claim 1, wherein
each first electrode is provided at the edge of one of the openings of the circuit board, and each second electrode is provided at the rearview element, the light module, the heating element, the sensing means or the human machine interface to be connected with the circuit board, and
each second protrusion is provided with a reduced diameter portion surrounded by the reduced diameter portion of the respective conductive spring and a shoulder acting as a stop for the respective conductive spring.

8. The rearview device of claim 1, further comprising:
a housing cover disposed between the rearview element and the housing to support at least the rearview element, wherein the housing cover includes a coated region having a predetermined reflectivity, with the coated region providing a bezel portion.

9. The rearview device of claim 8, wherein a periphery of the housing is formed to be larger than a periphery of the housing cover such that an edge of the housing is at least partially exposed to a driver of the vehicle, wherein a peripheral region of the housing cover includes a first surface which is exposed to a driver of the vehicle and a second surface which is not exposed to the driver of the vehicle and is received in the housing, wherein there is a step between the first surface and the second surface.

10. The rearview device of claim 8, wherein at least one third protrusion accommodates at least a part of the housing cover, with the housing cover being provided with at least one groove or opening corresponding to each of the third protrusions.

11. The rearview mirror device of claim 1, wherein the second protrusion, a first protrusion, and a third protrusion are formed in or together with the housing.

12. The rearview device of claim 1, wherein an adhesive element is provided between a housing cover and the rearview element for attaching the rearview element to the housing cover.

13. The rearview device of claim 12, wherein at least one opening is formed in a front portion or front plate of the housing cover such that the electrical connection between the rearview element, the light module, the heating element, the sensing means and the human machine interface on the one side and the circuit board on the other side is allowed through the opening, wherein the adhesive element is formed with a groove at a position corresponding to the opening such that the electrical connection provided through the at least one opening formed in the housing cover is directly transmitted to the rearview element, the light module, the heating element, the sensing means and the human machine interface.

14. The rearview device of claim 1, wherein at least one hole is formed in the housing so that at least one wire for providing the electrical connection provided from the vehicle to the circuit board passes through the hole, with the circuit board being provided with at least one connecting member for connecting the at least one wire and at least one component disposed on the circuit board.

15. The rearview device of claim 14, wherein the as least one wire passing through the hole is connected to the connecting member through an empty space between the mounting coupling portion and the circuit board, the hole is formed adjacent to the mounting coupling portion, and the connecting member is attached to one surface of the circuit board in a first direction or a second direction.

16. The rearview device of claim 1, wherein the rearview mirror device comprises the light module, the heating element, the sensing means and the human machine interface.

17. A vehicle with the at least one rearview device of claim 1.

* * * * *